United States Patent
Reiffenrath et al.

(10) Patent No.: US 7,316,830 B2
(45) Date of Patent: Jan. 8, 2008

(54) LIQUID-CRYSTALLINE PHENOL ESTERS

(75) Inventors: Volker Reiffenrath, Roβdorf (DE); Michael Heckmeier, Bensheim (DE); Eike Poetsch, Mühital (DE); Joachim Krause, Dieburg (DE); Werner Binder, Dieburg (DE); Brigitte Schuler, Haibach (DE); Achim Götz, Alsbach-Hähnlein (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 11/509,018

(22) Filed: Aug. 24, 2006

(65) Prior Publication Data
US 2006/0284139 A1    Dec. 21, 2006

Related U.S. Application Data

(62) Division of application No. 11/128,314, filed on May 13, 2005, now Pat. No. 7,179,511, which is a division of application No. 10/089,975, filed on Apr. 8, 2002, now abandoned.

(51) Int. Cl.
    *C09K 19/20*      (2006.01)
    *C09K 19/34*      (2006.01)
    *C09K 19/30*      (2006.01)
    *C09K 19/32*      (2006.01)
    *C07C 25/13*      (2006.01)

(52) U.S. Cl. .............. 428/1.1; 252/299.63; 252/299.67; 252/299.62; 252/299.61; 570/129

(58) Field of Classification Search ................. 428/1.1; 252/299.01, 299.61, 299.62, 299.63, 299.66, 252/299.67; 570/129
See application file for complete search history.

(56) References Cited

U.S. PATENT DOCUMENTS

| | | | |
|---|---|---|---|
| 5,679,285 A | 10/1997 | Bartmann et al. | |
| 5,800,735 A | 9/1998 | Poetsch et al. | |
| 6,180,027 B1 | 1/2001 | Kato et al. | |
| 6,521,303 B2 | 2/2003 | Heckmeier et al. | |
| 6,582,782 B2 | 6/2003 | Heckmeier et al. | |
| 6,780,477 B2 * | 8/2004 | Kirsch et al. | 428/1.1 |
| 6,793,985 B2 | 9/2004 | Nakajima et al. | |
| 6,808,764 B2 | 10/2004 | Heckmeier et al. | |
| 6,878,421 B2 * | 4/2005 | Heckmeier et al. | 428/1.1 |
| 7,056,561 B2 | 6/2006 | Heckmeier et al. | |
| 7,153,550 B2 * | 12/2006 | Heckmeier et al. | 428/1.3 |
| 7,179,511 B2 * | 2/2007 | Reiffenrath et al. | 428/1.1 |
| 7,189,440 B2 * | 3/2007 | Manabe et al. | 428/1.3 |

FOREIGN PATENT DOCUMENTS

| | | |
|---|---|---|
| DE | 198 59 421 | 6/2000 |
| EP | 446 911 | 9/1991 |
| EP | 460 436 | 12/1991 |
| EP | 738 709 | 10/1996 |
| EP | 765 926 | 4/1997 |
| JP | 09241645 | 9/1997 |
| WO | WO 9205230 | 4/1992 |
| WO | WO 97/34855 | 9/1997 |

OTHER PUBLICATIONS

English translation for JP 09-241645 by computer Http:/www4.jpdl.ncipi.go.jp/Tokujitu/PAJdetail.ipd?N0000=60&NO120=01&N2001=2&N3001=H09-241645.

* cited by examiner

*Primary Examiner*—Shean C Wu
(74) *Attorney, Agent, or Firm*—Millen, White, Zelano, Branigan, P.C.

(57) ABSTRACT

The invention relates to liquid-crystalline phenol esters of the formula I

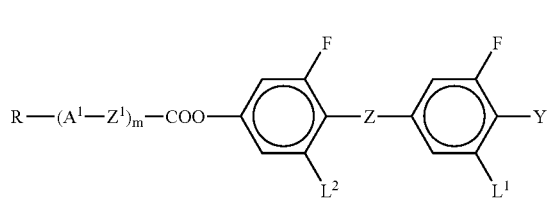

in which
R, $A^1$, $Z^1$, m, L and Y are as defined in Claim 1, to liquid-crystalline media comprising at least one phenol ester of the formula I, and to electro-optical displays containing such a liquid-crystalline medium.

30 Claims, No Drawings

LIQUID-CRYSTALLINE PHENOL ESTERS

This application is a divisional of U.S. application Ser. No. 11/128,314, filed May 13, 2005, now U.S. Pat. No. 7,179,511, which was a divisional of U.S. application Ser. No. 10/089,975, filed Apr. 8, 2002, now abandoned; both of which claimed priority of DE 19 947954.2, filed Oct. 6, 1999.

The present invention relates to liquid-crystalline phenol esters, to a liquid-crystalline medium, to the use thereof for electro-optical purposes and to displays containing this medium.

Liquid crystals are used, in particular, as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The most common display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and give short response times, low threshold voltages and high contrast in the cells.

They should furthermore have a suitable mesophase, for example a nematic or cholesteric mesophase for the above-mentioned cells, at conventional operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, must satisfy various requirements depending on the cell type and area of application. For example, materials for cells having a twisted nematic structure should have positive dielectric anisotropy and low electrical conductivity.

For example, media having large positive dielectric anisotropy, broad nematic phases, relatively low birefringence, very high resistivity, good UV and temperature stability and low vapour pressure are desired for matrix liquid-crystal displays containing integrated non-linear elements for switching individual pixels (MLC displays).

Matrix liquid-crystal displays of this type are known. Non-linear elements which can be used for individual switching of the individual pixels are, for example, active elements (i.e. transistors). This is then referred to as an "active matrix", and a distinction can be made between two types:

1. MOS (metal oxide semiconductor) or other diodes on a silicon wafer as substrate.
2. Thin-film transistors (TFTs) on a glass plate as substrate.

Use of single-crystal silicon as substrate material limits the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, for example CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be expanded to fully colour-compatible displays, in which a mosaic of red, green and blue filters is arranged in such a way that each filter element is located opposite a switchable pixel.

The TFT displays usually operate as TN cells with crossed polarizers in transmission and are backlit.

The term MLC displays here covers any matrix display containing integrated non-linear elements, i.e., besides the active matrix, also displays containing passive elements, such as varistors or diodes (MIM=metal-insulator-metal).

MLC displays of this type are particularly suitable for TV applications (for example pocket TVs) or for high-information displays for computer applications (lap-tops) and in automobile or aircraft construction. Besides problems regarding the angle dependence of the contrast and the response times, difficulties also arise in MLC displays due to inadequate resistivity of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display drops, and the problem of after-image elimination can occur. Since the resistivity of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high resistivity values. It is furthermore important that the resistivity increases as little as possible with increasing temperature and after heating and/or UV exposure. The low-temperature properties of the mixtures of the prior art are also particularly disadvantageous. It is required that crystallization and/or smectic phases do not occur, even at low temperatures, and that the temperature dependence of the viscosity is as low as possible. The MLC displays of the prior art thus do not satisfy today's requirements.

There thus continues to be a great demand for MLC displays which have very high resistivity at the same time as a broad operating temperature range, short response times, even at low temperatures, and a low threshold voltage, and which do not have these disadvantages, or only do so to a reduced extent.

In TN (Schadt-Helfrich) cells, media are desired which facilitate the following advantages in the cells:
  expanded nematic phase range (in particular down to low temperatures)
  switchability at extremely low temperatures (outdoor use, automobile, avionics)
  increased resistance to UV radiation (longer life)

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further extension of the parameter latitude available (clearing point, smectic-nematic transition or melting point, viscosity, dielectric parameters, elastic parameters) is urgently desired.

It is an object of the invention to provide media, in particular for these MLC, TN or STN displays, which do not have the abovementioned disadvantages or only do so to a reduced extent, and preferably at the same time have very high resistivity values and low threshold voltages.

WO 92/05 230 discloses compounds of the formula

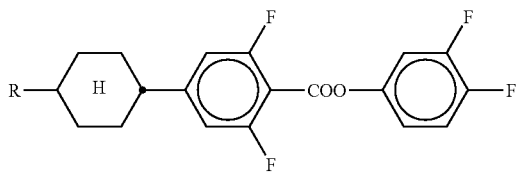

which, however, have comparatively low clearing points.

It has now been found that this object can be achieved by using the liquid-crystalline phenol esters according to the invention.

The invention thus relates to liquid-crystalline phenol esters of the formula I

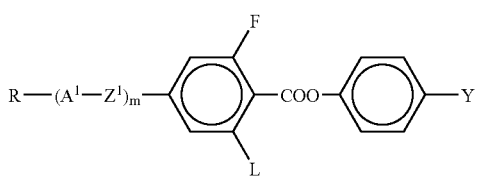

in which
R is H, an alkyl or alkenyl radical having up to 15 carbon atoms which is unsubstituted, monosubstituted by CN or $CF_3$ or at least monosubstituted by halogen, where one or more $CH_2$ groups in these radicals may also be replaced by —O—, —S—, —C≡C—, —OC—O— or —O—CO— in such a way that O atoms are not linked directly to one another,
$A^1$ a) is a 1,4-cyclohexenylene or 1,4-cyclohexylene radical, in which one or two non-adjacent $CH_2$ groups may be replaced by —O— or —S—,
b) is a 1,4-phenylene radical, in which one or two CH groups may be replaced by N,
c) is a piperidine-1,4-diyl, 1,4-bicyclo-[2.2.2]octylene, naphthalene-2,6-diyl, decahydronaphthalene-2,6-diyl or 1,2,3,4-tetrahydronaphthalene-2,6-diyl radical, where the radicals a), b) and c) may be monosubstituted or polysubstituted by halogen atoms,
$Z^1$ is —CO—O—, —O—CO—, —$CF_2$O—, —$OCF_2$—, —$CH_2$O—, —$OCH_2$—, —$CH_2CH_2$—, —$C_2F_4$—, —CH=CH—, —C≡C— or a single bond,
Y is F, Cl, CN or a monohalogenated or polyhalogenated alkyl, alkenyl, alkenyloxy or alkoxy radical having 1 to 5 carbon atoms,
L is H or F, and
m is 0, 1 or 2, and to the use thereof in liquid-crystalline media.

The compounds of the formula I have a broad range of applications. Depending on the choice of substituents, these compounds can serve as base materials of which liquid-crystalline media are predominantly composed; however, it is also possible to add compounds of the formula I to liquid-crystalline base materials from other classes of compound in order, for example, to modify the dielectric and/or optical anisotropy of a dielectric of this type and/or to optimize its threshold voltage and/or its viscosity.

In the pure state, the compounds of the formula I are colourless and form liquid-crystalline mesophases in a temperature range which is favourably located for electro-optical use. The compounds according to the invention are particularly notable for their high clearing point. They are stable chemically, thermally and to light.

In particular, the invention relates to compounds of the formula I, in which R is alkyl having 1 to 10 carbon atoms or an alkenyl radical having 2 to 10 carbon atoms.

Particular preference is given to compounds of the formula I in which L is F. m is preferably 1. $Z^1$ is preferably a single bond, furthermore —$CF_2$O—, —$OCF_2$—, —$C_2F_4$—, —$CH_2$O—, —$OCH_2$— or —COO—.

If R is an alkyl radical and/or an alkoxy radical, this can be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If R is an alkenyl radical, this can be straight-chain or branched. It is preferably straight-chain and has 2 to 10 carbon atoms. Accordingly, it is in particular vinyl, prop-1- or prop-2-enyl, but-1-, -2- or but-3-enyl, pent-1-, -2-, -3- or pent-4-enyl, hex-1-, -2-, -3-, -4- or hex-5-enyl, hept-1-, -2-, -3-, -4-, -5- or hept-6-enyl, oct-1-, -2-, -3-, -4-, -5-, -6- or oct-7-enyl, non-1-, -2-, -3-, -4-, -5-, -6-, -7- or non-8-enyl, dec-1-, -2-, -3-, -4-, -5-, -6-, -7-, -8- or dec-9-enyl.

If R is an alkyl radical in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 carbon atoms.

They are accordingly in particular acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl) ethyl, 2-(ethoxycarbonyl)ethyl, 2-(propoxycarbonyl)ethyl, 3—(methoxycarbonyl)propyl, 3-(ethoxycarbonyl)propyl or 4-(methoxycarbonyl)butyl.

If R is an alkyl or alkenyl radical which is mono-substituted by CN or $CF_3$, this radical is preferably straight-chain. The substitution by CN or $CF_3$ is in any position.

If R is an alkyl or alkenyl radical which is at least monosubstituted by halogen, this radical is preferably straight-chain and halogen is preferably F or Cl. In the case of polysubstitution, halogen is preferably F. The resulting radicals also include perfluorinated radicals. In the case of monosubstitution, the fluoro or chloro substituent can be in any desired position, but is preferably in the ω-position.

Compounds of the formula I containing branched pendant groups R may occasionally be of importance owing to better solubility in the conventional liquid-crystalline base materials, but in particular as chiral dopants if they are optically active. Smectic compounds of this type are suitable as components for ferro-electric materials.

Compounds of the formula I having $S_A$ phases are suitable, for example, for thermally addressed displays.

Branched groups of this type generally contain not more than one chain branch. Preferred branched radicals R are isopropyl, 2-butyl(=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

Y is preferably F, Cl, CN, $CF_3$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCFHCFHCF_3$, $OCH_2CF_2CF_3$, $OCF_2CF_2CF_3$, $OCF_2CFHCFH_2$, $OCF_2CH_2CF_2H$, $OCFHCF_2CFH_2$, $OCFHCFHCF_2H$, $OCFHCH_2CF_3$, $OCH_2CFHCF_3$, $OCH_2CF_2CF_2H$, $OCF_2CFHCH_3$, $OCF_2CH_2CFH_2$, $OCFHCF_2CH_3$, $OCFHCFHCFH_2$, $OCFHCH_2CF_3$, $OCH_2CF_2CFH_2$, $OCH_2CFHCF_2H$, $OCF_2CH_2CH_3$, $OCFHCFHCH_3$, $OCFHCH_2CFH_2$, $OCH_2CF_2CH_3$, $OCH_2CFHCFH_2$, $OCH_2CH_2CF_2H$, $OCHCH_2CH_3$, $OCH_2CFHCH_3$, $OCH_2CH_2CF_2H$, $OCClFCF_3$, $OCClFCClF_2$, $OCClFCFH_2$, $OCFHCCl_2F$, $OCClFCF_2H$, $OCClFCClF_2$, $OCF_2CClH_2$, $OCF_2CCl_2H$, $OCF_2CCl_2F$, $OCF_2CClFH$, $OCF_2CClF_2$, $OCF_2CF_2CClF_2$, $OCF_2CF_2CCl_2F$, $OCClFCF_2CF_3$, $OCClFCF_2CF_2H$, $OCClFCF_2CClF_2$, $OCClFCFHCF_3$, $OCClFCClFCF_3$, $OCCl_2CF_2CF_3$, $OCClHCF_2CF_3$, $OCClFCF_2CF_3$, $OCClFCClFCF_3$, $OCF_2CClFCFH_2$, $OCF_2CF_2CCl_2F$, $OCF_2CCl_2CF_2H$, $OCF_2CH_2CClF_2$, $OCClFCF_2CFH_2$, $OCFHCF_2CCl_2F$, $OCClFCFHCF_2H$, $OCClFCClFCF_2H$, $OCFHCFHCClF_2$, $OCClFCH_2CF_3$, $OCFHCCl_2CF_3$, $OCCl_2CFHCF_3$, $OCH_2CClFCF_3$, $OCCl_2CF_2CF_2H$, $OCH_2CF_2CClF_2$, $OCF_2CClFCH_3$, $OCF_2CFHCCl_2H$, $OCF_2CCl_2CFH_2$, $OCF_2CH_2CCl_2F$, $OCClFCF_2CH_3$, $OCFHCF_2CCl_2H$, $OCClFCClFCFH_2$, $OCFHCFHCCl_2F$, $OCClFCH_2CF_3$, $OCFHCCl_2CF_3$, $OCCl_2CF_2CFH_2$, $OCH_2CF_2CCl_2F$, $OCCl_2CFHCF_2H$, $OCClHCClFCF_2H$, $OCF_2CClHCClH_2$, $OCF_2CH_2CCl_2H$, $OCClFCFHCH_3$, $OCF_2CClFCCl_2H$, $OCClFCH_2CFH_2$, $OCFHCCl_2CFH_2$, $OCCl_2CF_2CH_3$, $OCH_2CF_2CClH_2$, $OCCl_2CFHCFH_2$, $OCH_2CClFCFCl_2$, $OCH_2CH_2CF_2H$, $OCClHCClHCF_2H$, $OCH_2CCl_2CF_2H$, $OCClFCH_2CH_3$, $OCFHCH_2CCl_2H$, $OCClHCFHCClH_2$, $OCH_2CFHCCl_2H$, $OCCl_2CH_2CF_2H$, $OCH_2CCl_2CF_2H$, $CH=CF_2$, $CF=CF_2$, $OCH=CF_2$, $OCF=CF_2$, $CH=CHF$, $OCH=CHF$, $CF=CHF$, $OCF=CHF$, *in particular* F, Cl, CN, $CF_3$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCF_2CF_2CF_3$, $OCF_2CHFCF_3$, $OCClFCF_2CF_3$.

For reasons of simplicity, hereinafter $A^2$ is a radical of the formula

Cyc is a 1,4-cyclohexylene radical, $A^3$ is

Che is a 1,4-cyclohexenyl radical, Dio is a 1,3-dioxane-2,5-diyl radical, Dit is a 1,3-dithiane-2,5-diyl radical, Phe is a 1,4-phenylene radical, Pyd is a pyridine-2,5-diyl radical, Pyr is a pyrimidine-2,5-diyl radical, Bi is a bicyclo[2.2.2]octylene radical, PheF is a 2- or 3-fluoro-1,4-phenylene radical, PheFF is a 2,6-difluoro-1,4-phenylene radical, Nap is a substituted or unsubstituted naphthalene radical and Dec is a decahydronaphthalene radical.

Accordingly, the compounds of the formula I include the preferred bicyclic compounds of the subformula Ia:

R-$A^2$-COO-$A^3$-Y        Ia, tricyclic compounds of the subformulae Ib and Ic:

R-$A^1$-$A^2$-COO-$A^3$-Y        Ib

R-$A^1$-$Z^1$-$A^2$-COO-$A^3$-Y        Ic and tetracyclic compounds of the subformulae Id to Ig:

R-$A^1$-$A^1$-$A^2$-COO-$A^3$-Y        Id

R-$A^1$-$Z^1$-$A^1$-$A^2$-COO-$A^3$-Y        Ie

R-$A^1$-$A^1$-$Z^1$-$A^2$-COO-$A^3$-Y        If

R-$A^1$-$Z^1$-$A^1$-$Z^1$-$A^2$-COO-$A^3$-Y        Ig.

In the subformulae Id to Ig, the rings $A^1$ and the bridges $Z^1$ can each be identical or different.

Of these, the compounds of the subformulae Ia, Ib and Ic are particularly preferred.

In the compounds of the formulae above and below, Y is preferably F, CN, $OCF_3$, $OCHF_2$, $CF_3$, $OCHFCF_3$, $OC_2F_5$ or $OCF_2CHFCF_3$.

R is preferably straight-chain alkyl, alkoxy, alkenyloxy or alkenyl having up to 10 carbon atoms.

$A^1$ is preferably Phe, PheF, PheFF, Cyc or Che, furthermore Pyr or Dio, Dec or Nap. The compounds of the formula I preferably contain not more than one of the radicals Bi, Pyd, Pyr, Dio, Dit, Nap or Dec.

Preference is also given to all compounds of the formula I and all subformulae, in which $A_1$ is monosubstituted or disubstituted 1,4-phenylene, in particular 2-fluoro-1,4-phenylene, 3-fluoro-1,4-phenylene, 2,3-difluoro-1,4-phenylene and 2,6-difluoro-1,4-phenylene.

Preferred smaller groups of compounds of the formula I are those of the subformulae I1 to I12:

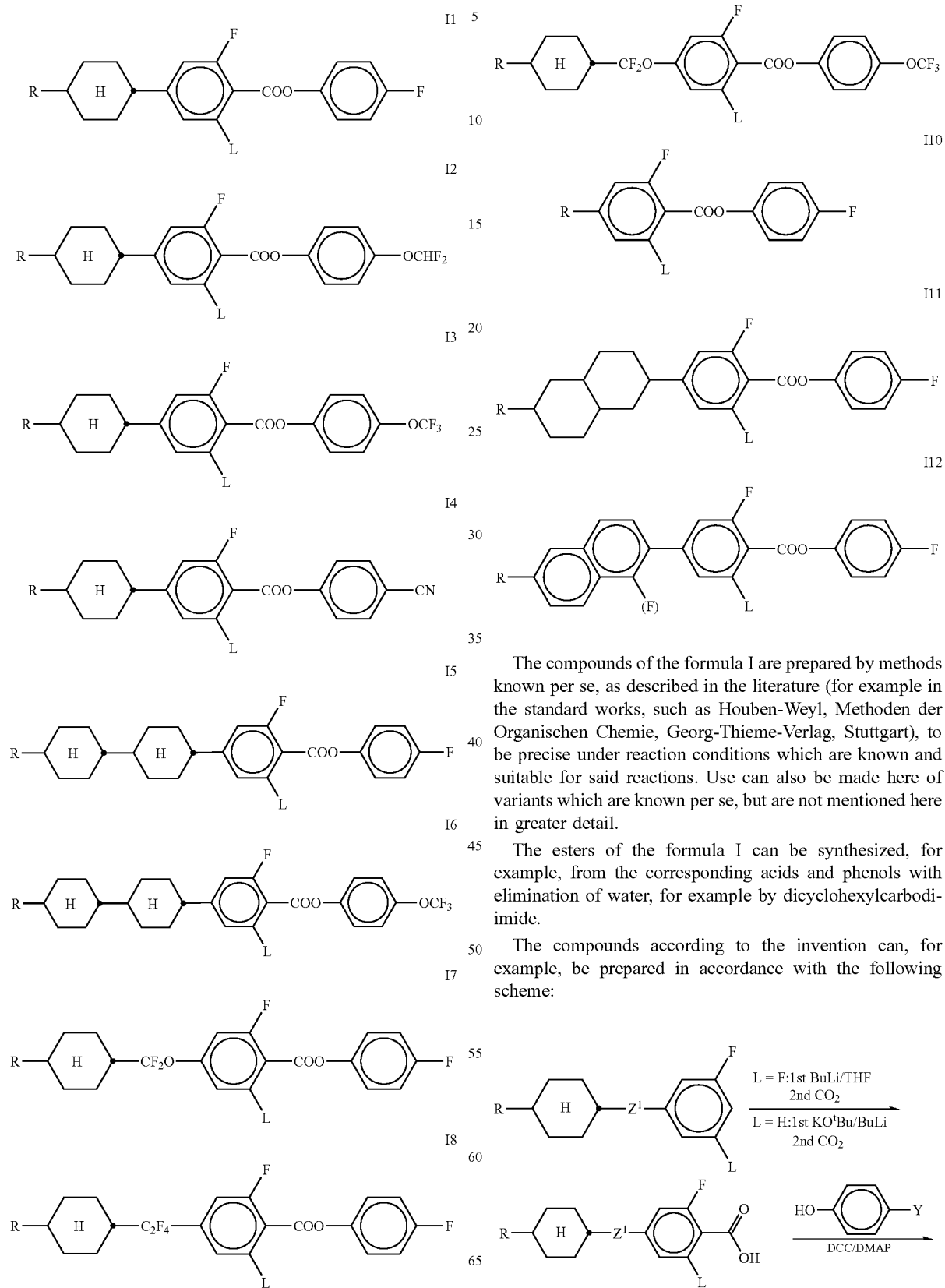

The compounds of the formula I are prepared by methods known per se, as described in the literature (for example in the standard works, such as Houben-Weyl, Methoden der Organischen Chemie, Georg-Thieme-Verlag, Stuttgart), to be precise under reaction conditions which are known and suitable for said reactions. Use can also be made here of variants which are known per se, but are not mentioned here in greater detail.

The esters of the formula I can be synthesized, for example, from the corresponding acids and phenols with elimination of water, for example by dicyclohexylcarbodiimide.

The compounds according to the invention can, for example, be prepared in accordance with the following scheme:

-continued

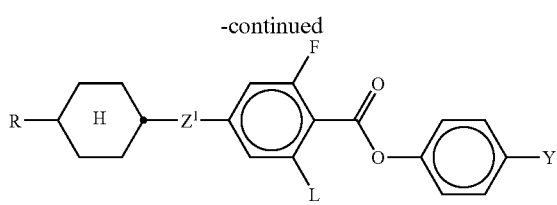

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high resistivity which is located in the cell) which contain media of this type, and to the use of these media for electro-optical purposes.

The liquid-crystal mixtures according to the invention allow a significant extension of the parameter latitude which is available.

The achievable combinations of clearing point, viscosity at low temperature, thermal and UV stability and dielectric anisotropy are far superior to current prior-art materials.

The requirement for a high clearing point, nematic phase at low temperature and a high $\Delta\epsilon$ has hitherto only been met inadequately. Although liquid-crystal mixtures such as, for example, MLC-6476 and MLC-6625 (Merck KGaA, Darmstadt, Germany) have comparable clearing points and low-temperature stabilities, they have, however, much higher $\Delta n$ values of about 0.075 and much higher threshold voltages of about $\geq 1.7$ V.

Other mixture systems have comparable viscosities and $\Delta\epsilon$ values, but only have clearing points in the region of 60° C.

While maintaining the nematic phase down to −20° C., preferably down to −30° C., particularly preferably down to −40° C., the liquid-crystal mixtures according to the invention allow clearing points above 80° C., preferably above 90° C., particularly preferably above 100° C., simultaneously dielectric anisotropy values $\Delta\epsilon \geq 4$, preferably $\geq 6$ and a high resistivity, allowing excellent STN and MLC displays to be achieved. In particular, the mixtures are characterized by low operating voltages. The TN thresholds are below 1.5 V, preferably below 1.3 V, particularly preferably <1.0 V.

It goes without saying that a suitable choice of the components of the mixtures according to the invention also allows higher clearing points (for example above 110° C.) to be achieved at higher threshold voltages, or lower clearing points to be achieved at lower threshold voltages, while retaining the other advantageous properties. Likewise, mixtures of higher $\Delta\epsilon$ and thus lower thresholds can also be obtained at viscosities which are increased correspondingly little. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. Thus, significantly higher resistivities can be achieved using the mixtures according to the invention at the first minimum than in the case of mixtures comprising cyano compounds. A person skilled in the art can use simple routine methods to produce the birefringence necessary for a specified layer thickness of the MLC display by suitable choice of the individual components and their proportions by weight.

The flow viscosity $\nu_{20}$ at 20° C. is preferably <60 mm$^2 \cdot$s$^{-1}$, particularly preferably <50 mm$^2 \cdot$s$^{-1}$. The nematic phase range is preferably at least 90°, in particular at least 100°. This range preferably extends at least from −30° to +80°.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] show that mixtures according to the invention and comprising compounds of the formula I exhibit a considerably smaller drop in the HR with increasing temperature than do analogous mixtures in which the compounds of the formula I are replaced by cyanophenylcyclohexanes of the formula

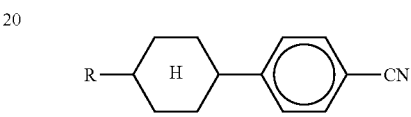

or esters of the formula

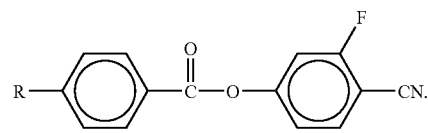

The UV stability of the mixtures according to the invention is also considerably better, i.e. they exhibit a significantly smaller drop in HR on UV exposure.

The media according to the invention are preferably based on a plurality (preferably two, three or more) of compounds of the formula I, i.e. the proportion of these compounds is 5-95%, preferably 10-60%, and particularly preferably in the range 20-50%.

The individual compounds of the formulae I to IX and their subformulae which can be used in the media according to the invention are either known or can be prepared analogously to the known compounds.

Preferred embodiments are indicated below:

The medium comprises compounds of the formula I, in which R is preferably ethyl and/or propyl, furthermore butyl and pentyl. Compounds of the formula I having short side chains R have a positive effect on the elastic constants, in particular $K_1$, and give mixtures having particularly low threshold voltages.

The medium additionally comprises one or more compounds selected from the group consisting of the general formulae II to IX:

II

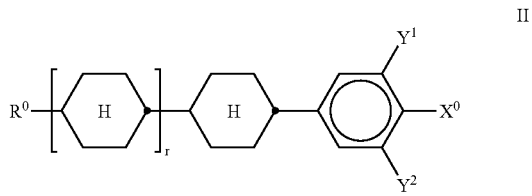

-continued

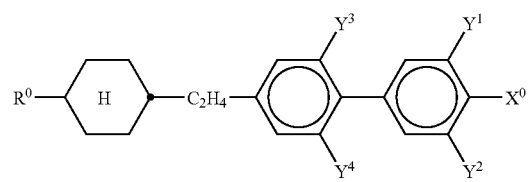
III

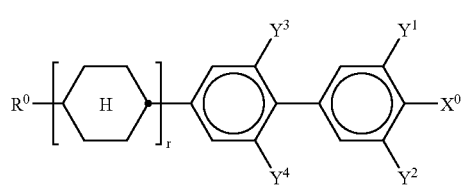
IV

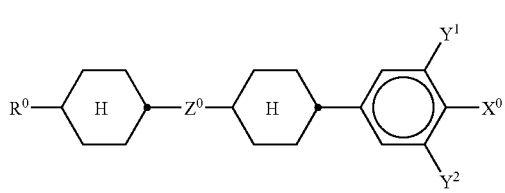
V

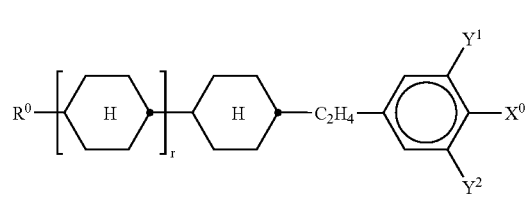
VI

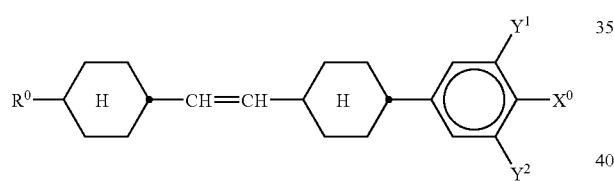
VII

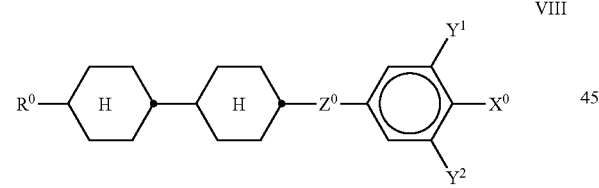
VIII

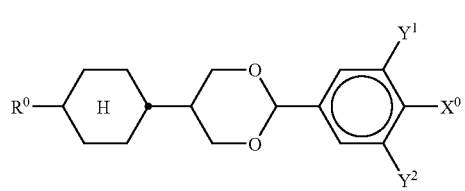
IX in which the individual radicals have the following meanings:

$R^0$ is n-alkyl, oxaalkyl, fluoroalkyl, alkenyloxy or alkenyl, in each case having up to 9 carbon atoms, $X^0$ is F, Cl, halogenated alkyl, alkenyl, alkenyloxy or alkoxy having 1 to 6 carbon atoms, $Z^0$ is —C$_2$H$_4$—, —C$_2$F$_4$—, —CF$_2$O—, —OCF$_2$— or —COO—, $Y^1$, $Y^2$, $Y^3$ and $Y^4$ are each, independently of one another, H or F, and r is 0 or 1.

The compound of the formula IV is preferably

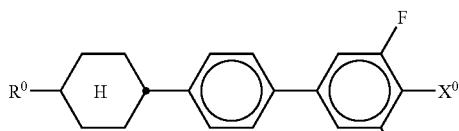

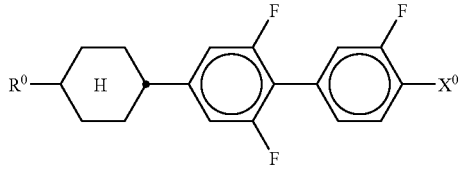

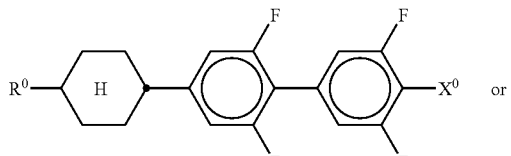 or

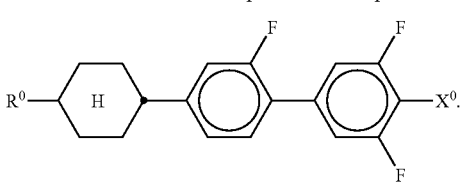

The medium additionally comprises one or more compounds of the formulae

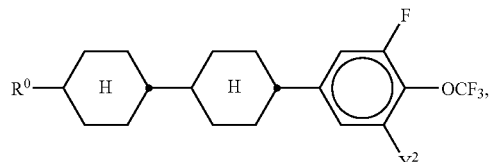

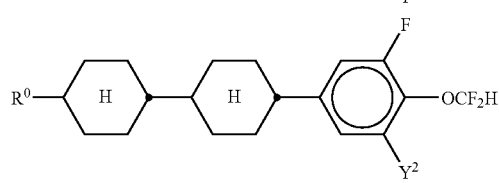

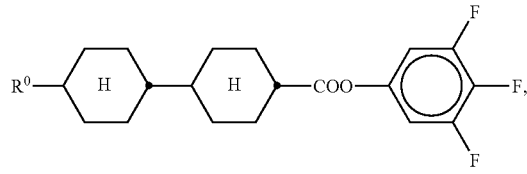

-continued

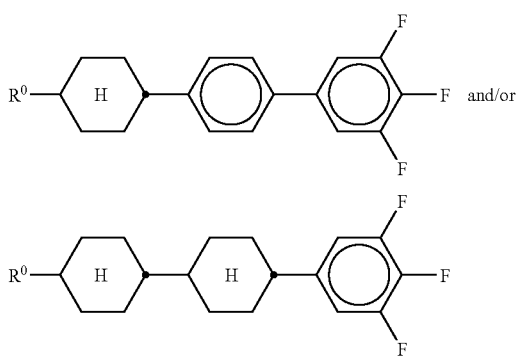

in which $R^0$ and $Y^2$ are as defined above.

The medium additionally comprises one or more compounds selected from the group consisting of the general formulae X to XV:

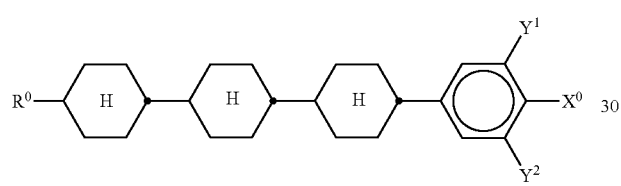 X

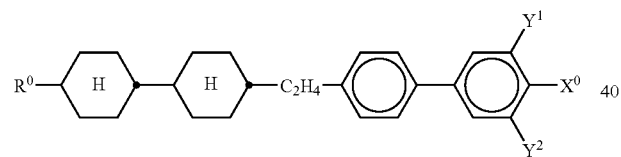 XI

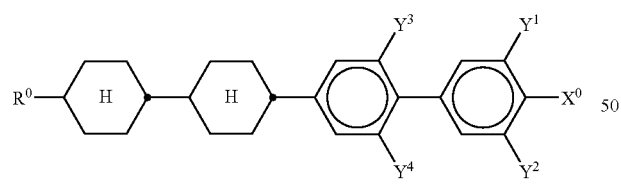 XII

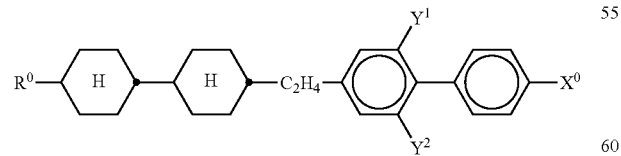 XIII

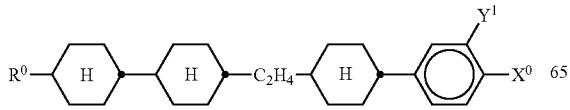 XIV

-continued

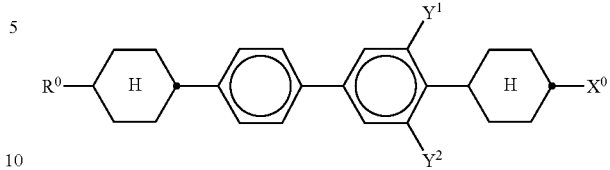 XV in which $R^0$, $X^0$, $Y^1$, $Y^2$, $Y^3$ and $Y^4$ are each independently of one another, as defined in Claim 7. $X^0$ is preferably F, Cl, $CF_3$, $OCF_3$, $OCHF_2$, and $R^0$ is alkyl, oxaalkyl, fluoroalkyl, alkenyl or alkenyloxy, in each case having up to 6 carbon atoms.

The proportion of compounds of the formulae I to IX together in the total mixture is at least 50% by weight.

The proportion of compounds of the formula I in the total mixture is from 5 to 50% by weight.

The proportion of compounds of the formulae II to XI in the total mixture is from 30 to 70% by weight.

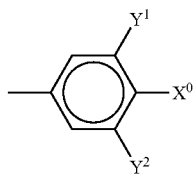

is preferably

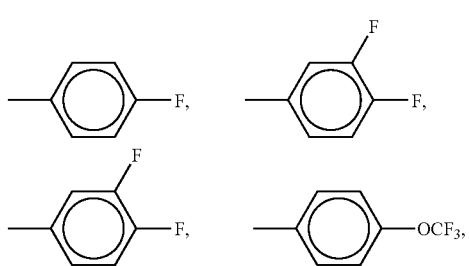

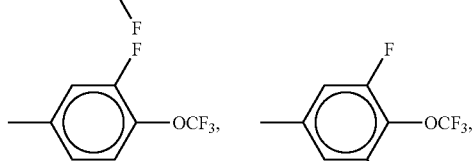

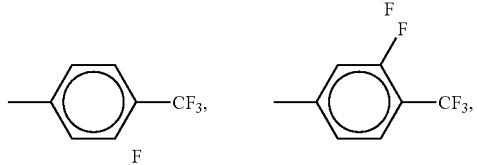

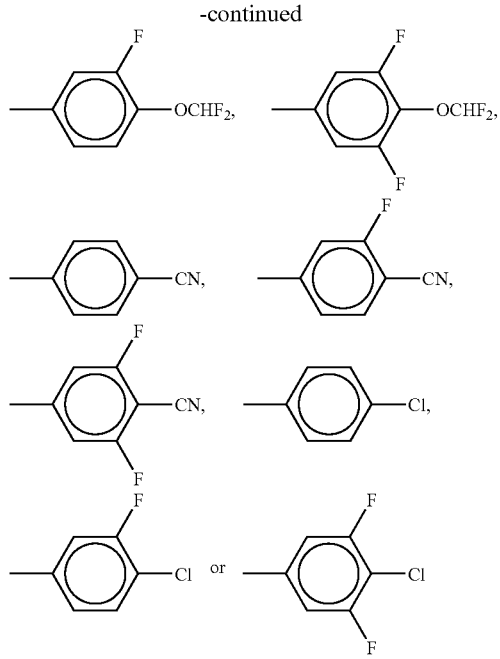

The medium comprises compounds of the formulae II, III, IV, V, VI, VII, VIII and/or IX.

$R^0$ is straight-chain alkyl or alkenyl having 2 to 6 carbon atoms.

The medium essentially consists of compounds of the formulae I to XV.

The medium comprises further compounds, preferably selected from the following group consisting of the general formulae XVI to XIX:

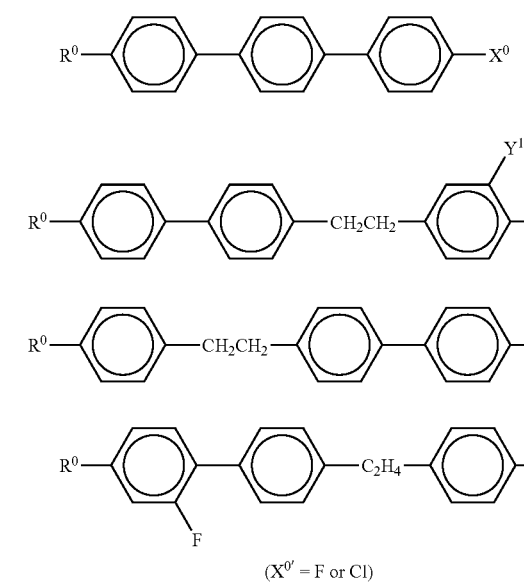

(X$^{0'}$ = F or Cl)

in which $R^0$ and $X^0$ are as defined above and the 1,4-phenylene rings can be substituted by CN, chlorine or fluorine. The 1,4-phenylene rings are preferably monosubstituted or polysubstituted by fluorine atoms.

The medium comprises further compounds, preferably selected from the following group consisting of the formulae RI to RVI:

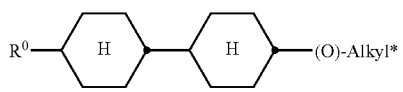

RI

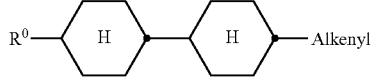

RII

RIII

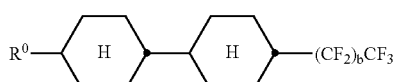

RIV

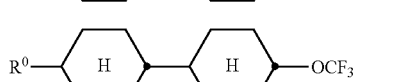

RV

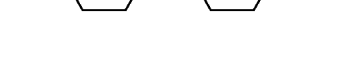

RVI

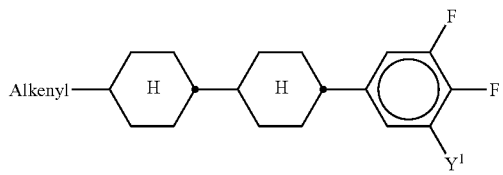

in which $R^0$ is n-alkyl, oxoalkyl, fluoroalkyl, alkenyloxy or alkenyl, in each case having up to 9 carbon atoms, b is 0, 1 or 2, $Y^1$ is H or F, Alkyl* is a straight-chain alkyl radical having up to 9 carbon atoms, Alkenyl or Alkenyl*
  is, in each case independently of one another, an alkenyl radical having up to 9 carbon atoms.

The medium preferably comprises one or more compounds of the formulae

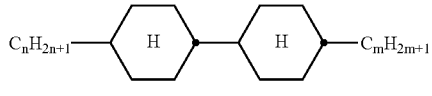

RIa

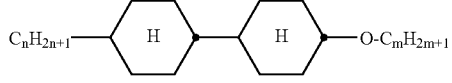

RIb

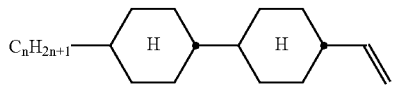

RIIa

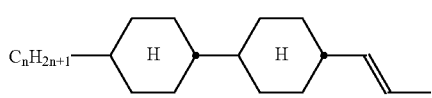

RIIb

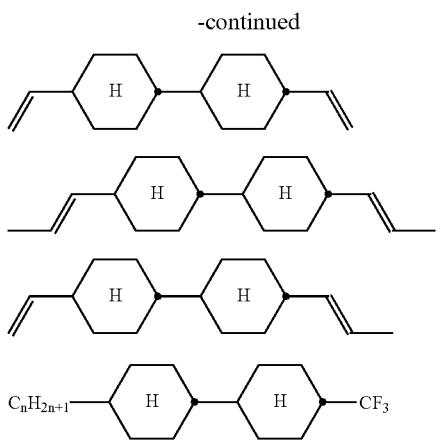

in which n and m are each an integer from 1-9.

The weight ratio I: (II+III+IV+V+VI+VII+VIII+IX) is preferably from 1:10 to 10:1.

The medium essentially consists of compounds selected from the group consisting of the general formulae I to XV.

It has been found that even a relatively small proportion of compounds of the formula I mixed with conventional liquid-crystal materials, but in particular with one or more compounds of the formulae II, III, IV, V, VI, VII, VIII and/or IX leads to a considerable decrease in the threshold voltage and to low birefringence values, where broad nematic phases with low smectic-nematic transition temperatures are simultaneously observed, which improve the storage stability. The compounds of the formulae I to IX are colourless, stable and readily miscible with one another and with other liquid-crystal materials.

The term "alkyl" or "alkyl*" encompasses straight-chain and branched alkyl groups having 1-9 carbon atoms, particularly the straight-chain groups methyl, ethyl, propyl, butyl, pentyl, hexyl and heptyl. Groups having 2-5 carbon atoms are generally preferred.

The term "alkenyl" or "alkenyl*" encompasses straight-chain and branched alkenyl groups having up to 9 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups with terminal fluorine, i.e. fluoromethyl, 2-fluoroethyl, 3-fluoropropyl, 4-fluorobutyl, 5-fluoropentyl, 6-fluorohexyl and 7-fluoroheptyl. Other positions of fluorine are not precluded, however.

The term "oxaalkyl" preferably encompasses straight-chain radicals of the formula $C_nH_{2n+1}$—O—$(CH_2)_m$, in which n and m are each, independently of one another, from 1 to 6. Preferably, n=1 and m is 1 to 6.

A suitable choice of the meanings of $R^o$ and $X^o$ allows the response times, the threshold voltage, the slope of the transmission characteristic lines etc. to be modified as desired. For example, 1E-alkenyl radicals, 3E-alkenyl radicals, 2E-alkenyloxy radicals and the like generally result in shorter response times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally result in lower threshold voltages and smaller values of $k_{33}/k_{11}$ compared with alkyl and alkoxy radicals.

A —$CH_2CH_2$— group in $Z^1$ generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (higher multiplexability), and vice versa.

The optimum weight ratio of compounds of the formulae I and II+III+IV+V+VI+VII+VIII+IX largely depends on the desired properties, on the choice of the components of the formulae I, II, III, IV, V, VI, VII, VIII, and/or IX, and on the choice of any other components which may be present. Suitable ratios within the range given above can easily be determined from case to case.

The total amount of compounds of the formulae I to XV in the mixtures according to the invention is not critical. The mixtures can therefore comprise one or more further components in order to optimize various properties. However, the observed effect on the response times and the threshold voltage is usually greater the higher the total concentration of compounds of the formulae I to XV.

In a particularly preferred embodiment, the media according to the invention comprise compounds of the formulae II to IX (preferably II and/or III) in which $X^o$ is $OCF_3$, $OCHF_2$, F, $OCH$=$CF_2$, $OCF$=$CF_2$, $OCF_2CHFCF_3$ or $OCF_2$—$CF_2H$. A favourable synergistic effect with the compounds of the formula I results in particularly advantageous properties.

The construction of the MLC display according to the invention from polarizers, electrode base plates and surface-treated electrodes corresponds to the conventional construction for displays of this type. The term conventional construction is broadly drawn here and also covers all variations and modifications of the MLC display, in particular including matrix display elements based on poly-Si TFT or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in a lesser amount is dissolved in the components making up the principal constituent, expediently at elevated temperature. It is also possible to mix solutions of the components in an organic solvent, for example in acetone, chloroform or methanol, and to remove the solvent again after thorough mixing, for example by distillation.

The dielectrics may also comprise further additives known to the person skilled in the art and described in the literature. For example, 0-15% of pleochroic dyes and/or chiral dopants can be added.

C denotes a crystalline phase, S a smectic phase, $S_C$ a smectic C phase, N a nematic phase and I the isotropic phase.

$V_{10}$ denotes the voltage for 10% transmission (viewing direction perpendicular to the plate surface). $t_{on}$ denotes the on and $t_{off}$ the off time at an operating voltage corresponding to 2.5 times the value of $V_{10}$. $\Delta n$ denotes the optical anisotropy and $n_o$ the refractive index. $\Delta \epsilon$ denotes the dielectric anisotropy ($\Delta\epsilon = \epsilon_\parallel - \epsilon_\perp$, where $\Delta_\parallel$ refers to the dielectric constant parallel to the longitudinal axes of the molecule and $\Delta_\perp$ is the dielectric constant perpendicular thereto). The electro-optical data were measured in a TN cell in the 1st minimum (i.e. at a d·Δn value of 0.5) at 20° C., unless expressly stated otherwise. The optical data were measured at 20° C., unless expressly stated otherwise.

In the present application and in the following examples, the structures of the liquid-crystal compounds are specified by acronyms, which can be transformed into chemical formulae according to the following Tables A and B. All radicals $C_nH_{2n+1}$ and $C_mH_{2m+1}$ are straight-chain alkyl radicals having n or m carbon atoms. The coding according to Table B is self-evident. Table A specifies the acronym for the parent body only. In individual cases, the acronym for the parent body is followed, separated therefrom by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_2H_{2s}$— | CN | H | H |
| nAm | $C_nH_{2n+1}$ | COOC$_m$H$_{2m+1}$ | H | H |
| nOCCF$_2$.F.F | $C_nH_{2n+1}$ | OCH$_2$CF$_2$H | F | F |

Preferred mixture components are shown in Tables A and B.

TABLE A

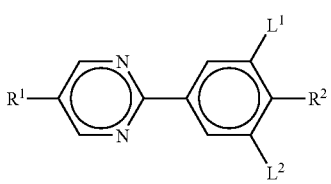

PYP

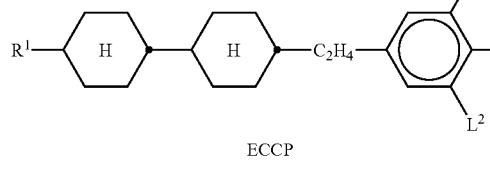

PYRP

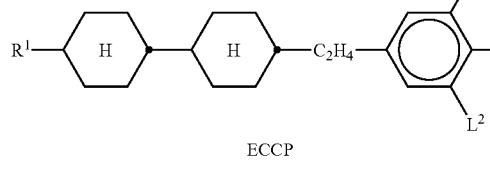

BCH

TABLE A-continued

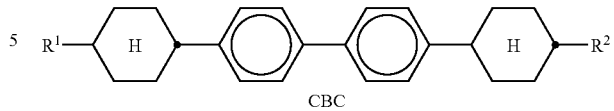

CBC

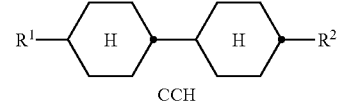

CCH

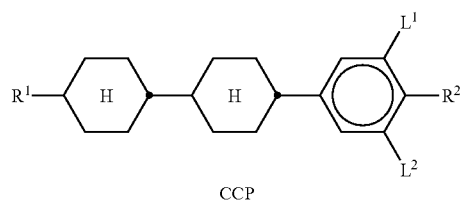

CCP

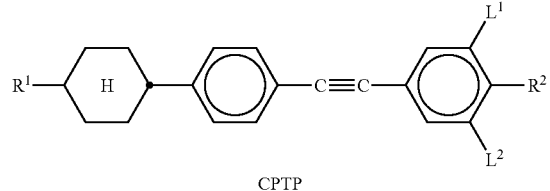

CPTP

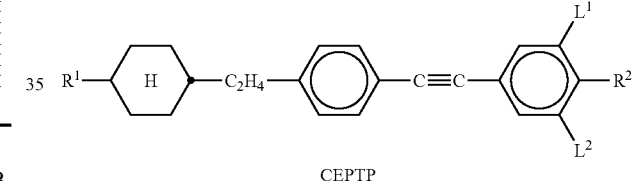

CEPTP

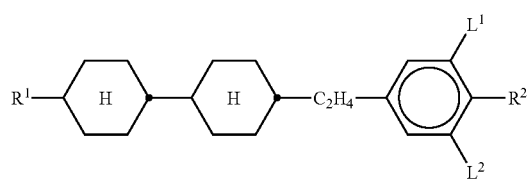

ECCP

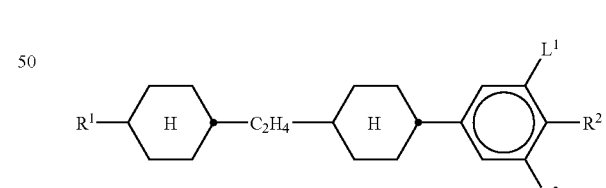

CECP

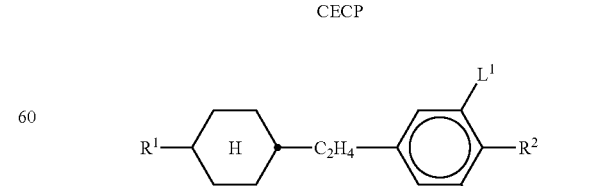

EPCH

TABLE A-continued
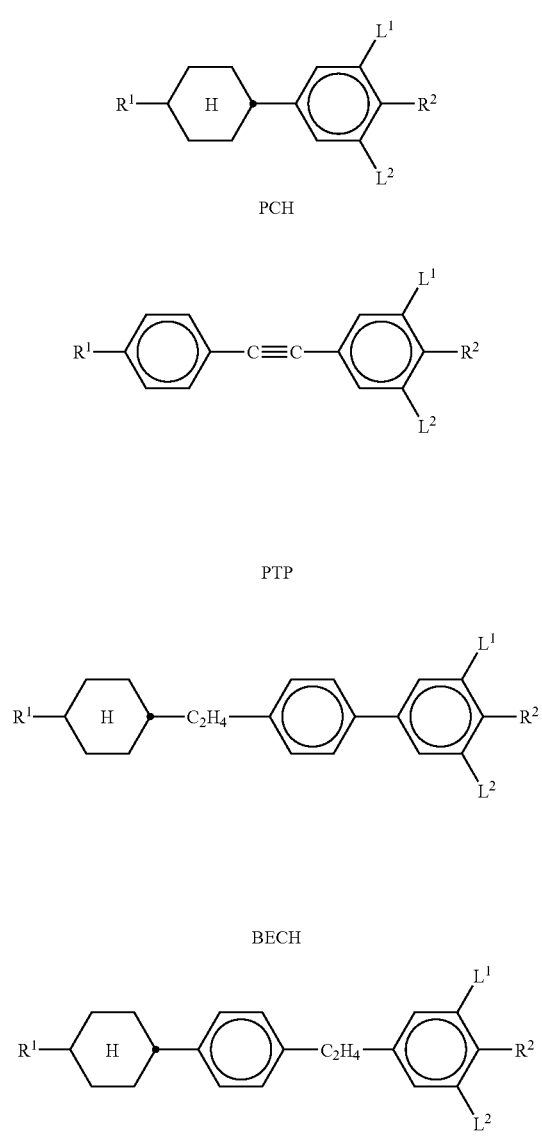
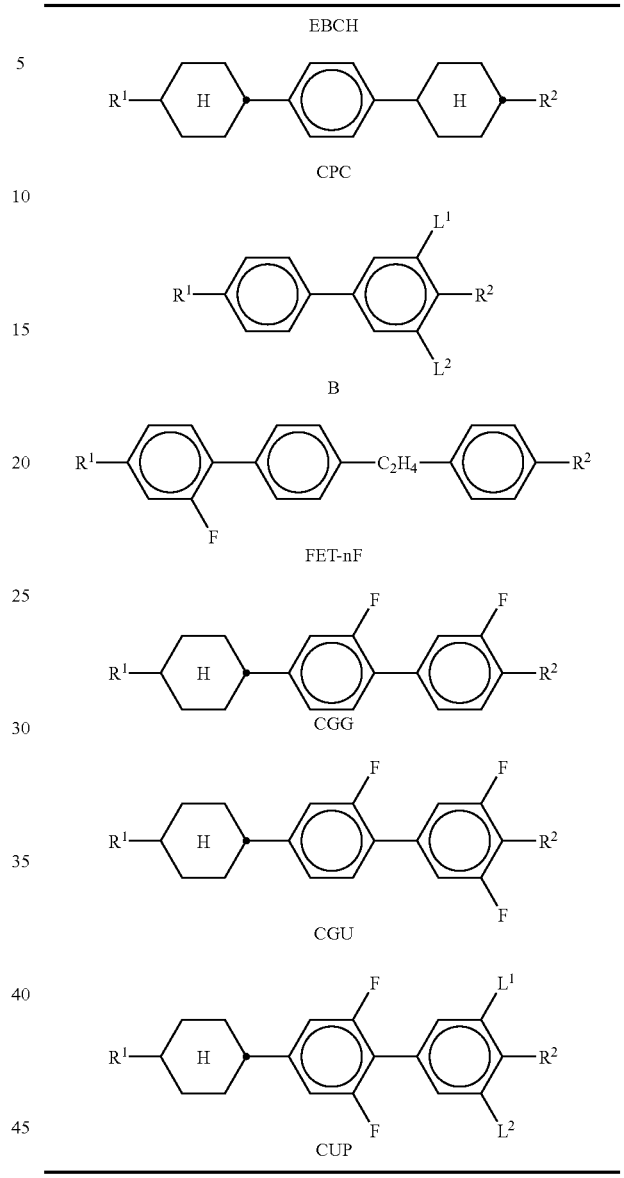
TABLE B
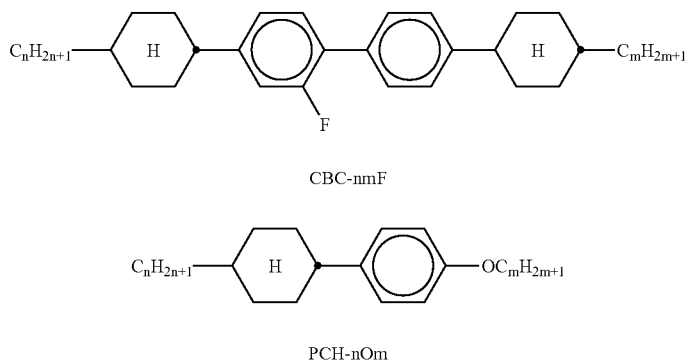

TABLE B-continued
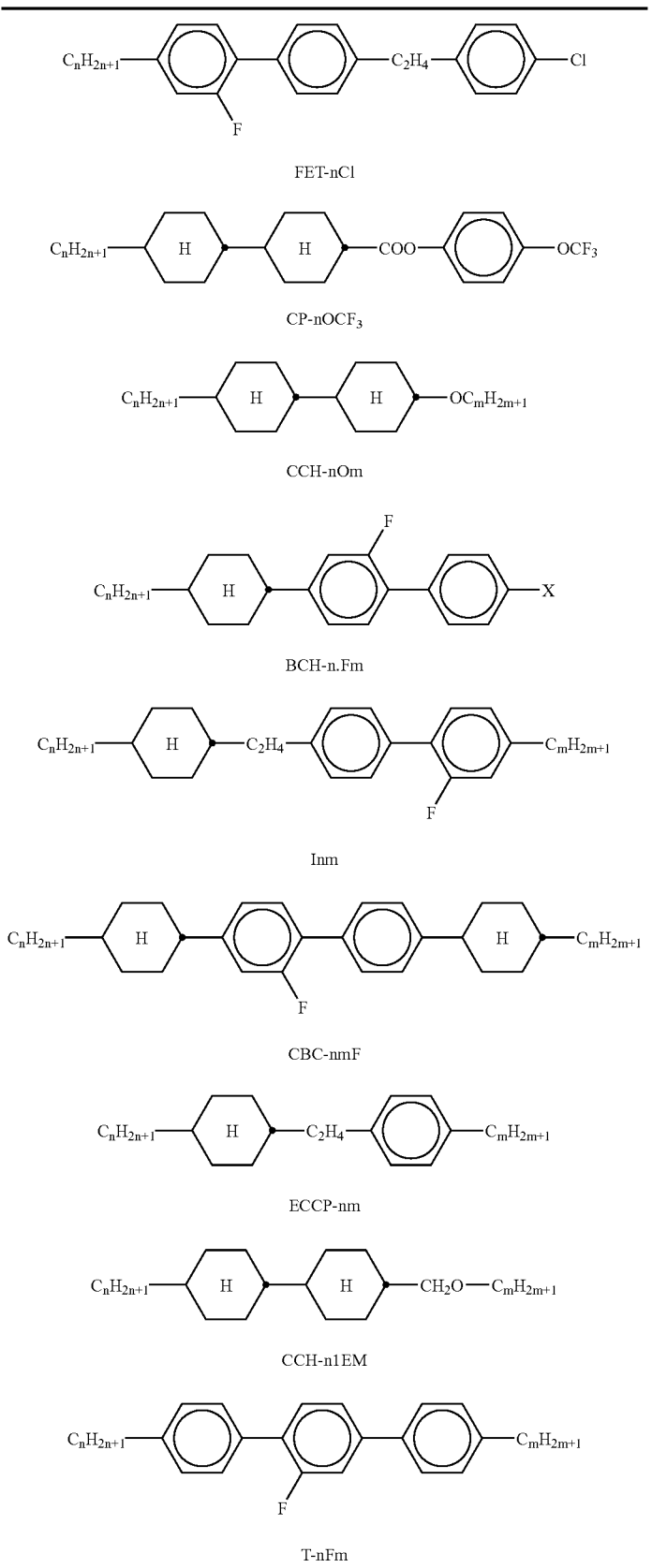
FET-nCl
CP-nOCF3
CCH-nOm
BCH-n.Fm
Inm
CBC-nmF
ECCP-nm
CCH-n1EM
T-nFm TABLE B-continued
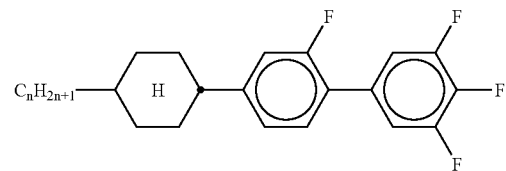
CGU-n-F
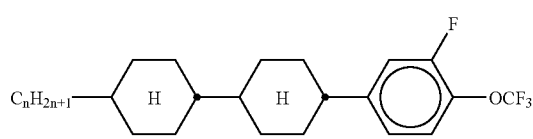
CCP-nOCF₃.F
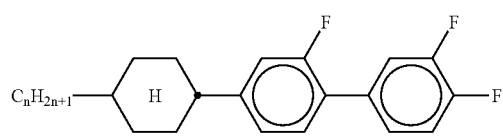
CGG-n-F
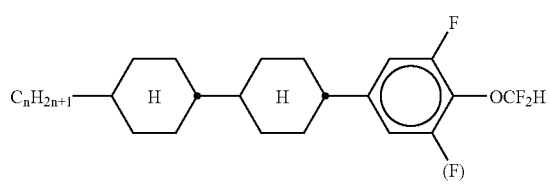
CCP-nOCF₂.F(.F)
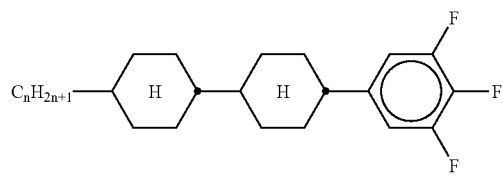
CCP-nF.F.F
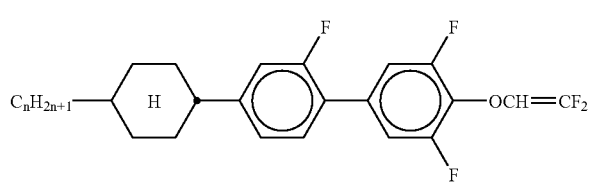
CGU-n-OXF
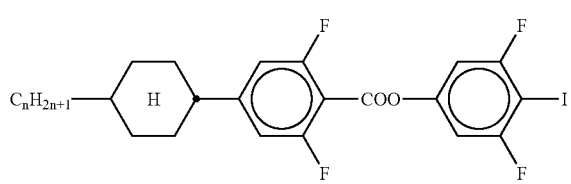
CUZU-n-F TABLE B-continued
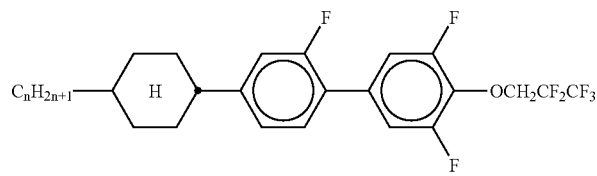
CGU-n-O1DT
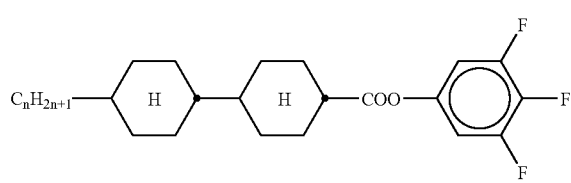
CCZU-n-F
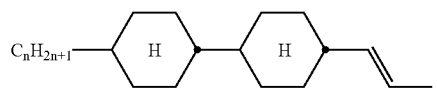
CC-n-V1
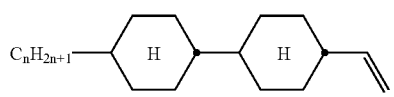
CC-n-V
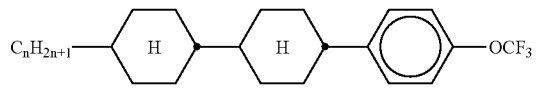
CCP-nOCF$_3$
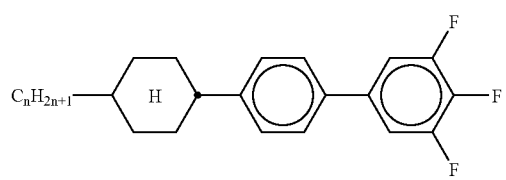
BCH-nF.F.F
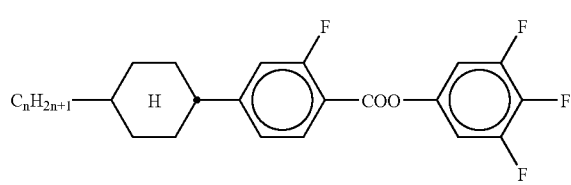
CGZU-n-F
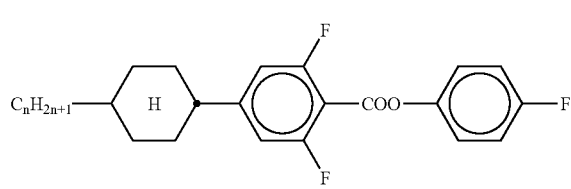
CUZP-n-F TABLE B-continued
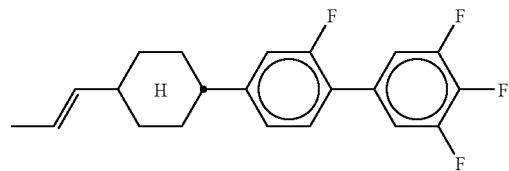
CGU-1V-F
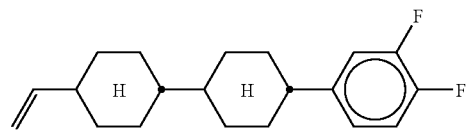
CCG-V-F
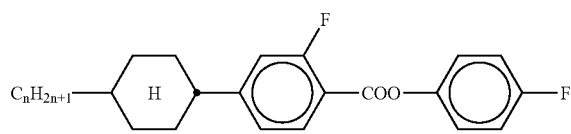
CGZP-n-F
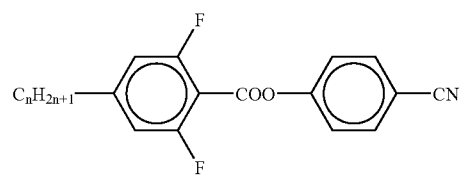
UZP-n-N
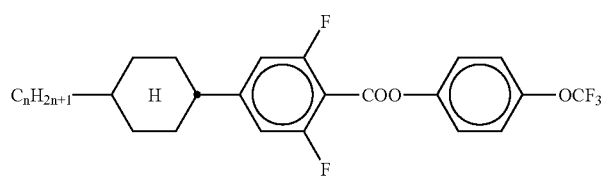
CUZP-n-OT
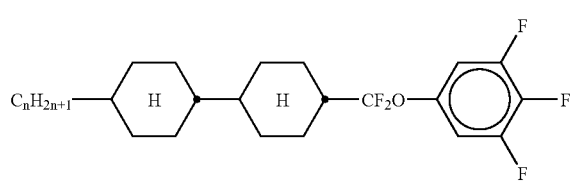
CCQU-n-F
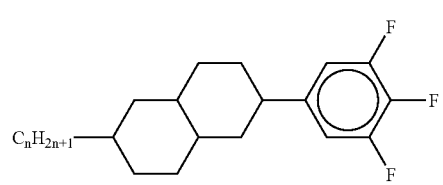
Dec-U-n-F TABLE B-continued

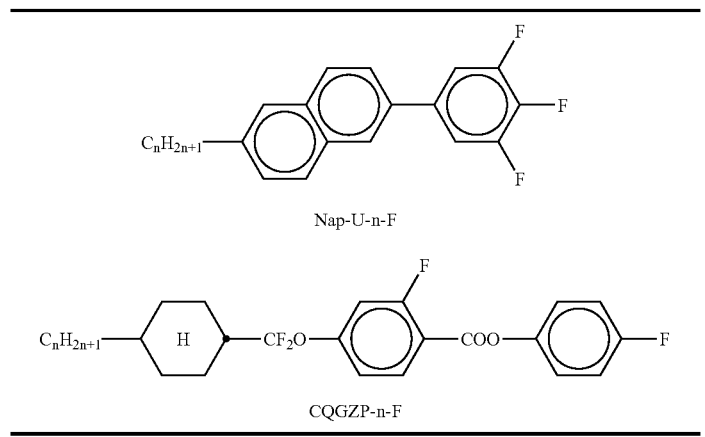

TABLE C

Table C specifies possible dopants which are generally added to the mixtures according to the invention.

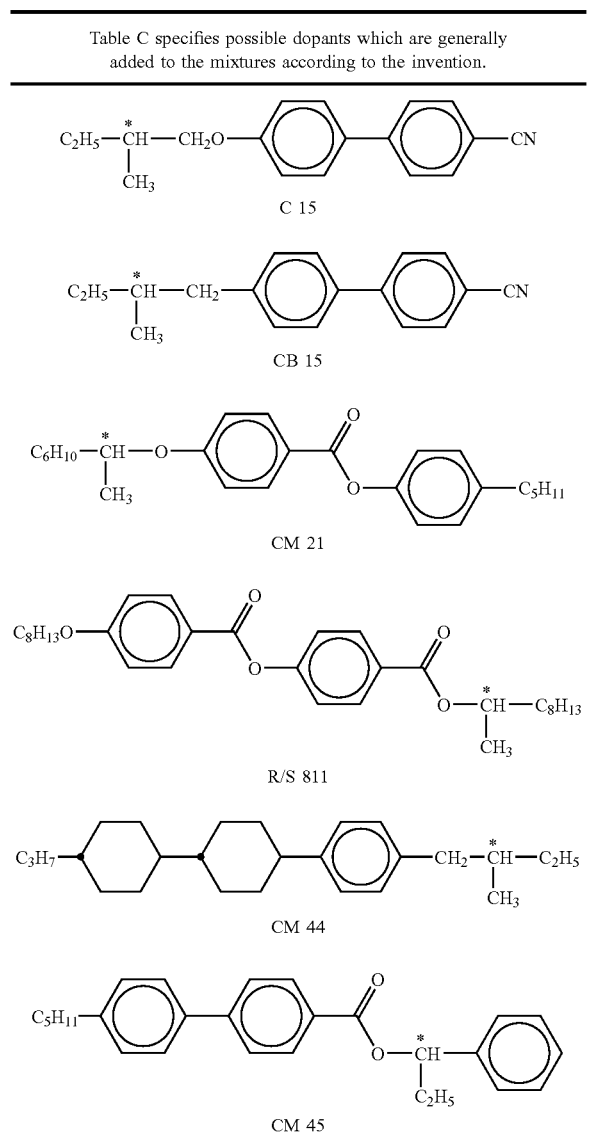

TABLE C-continued

Table C specifies possible dopants which are generally added to the mixtures according to the invention.

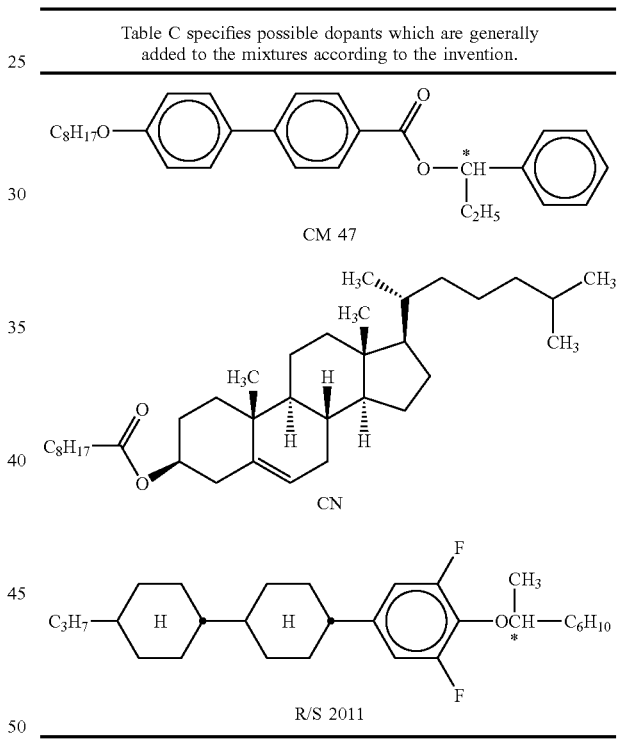

The following examples are intended to illustrate the invention without limiting it. Hereinbefore and hereinafter, percentages are given in percent by weight. All temperatures are specified in degrees Celsius. m.p. denotes melting point, cl.p. denotes clearing point. Furthermore, C=crystalline state, N=nematic phase, S=smectic phase and I=isotropic phase. The data between these symbols represent the transition temperatures. Δn denotes the optical anisotropy (589 nm, 20° C.), and the flow viscosity (mm²/sec) and the rotational viscosity $\gamma_1$ (mPa·s) were each determined at 20° C.

Conventional work-up means that water is added if necessary, the mixture is extracted with dichloromethane, diethyl ether, methyl tert-butyl ether or toluene, the organic phase is separated off, dried and evaporated, and the product is purified by distillation under reduced pressure or crystallization and/or chromatography. The following abbreviations are used:

| | |
|---|---|
| n-BuLi | 1.6 molar solution of n-butyllithium in n-hexane |
| DMAP | 4-(dimethylamino)pyridine |
| THF | tetrahydrofuran |
| DCC | N,N'-dicyclohexylcarbodiimide |

EXAMPLE 1

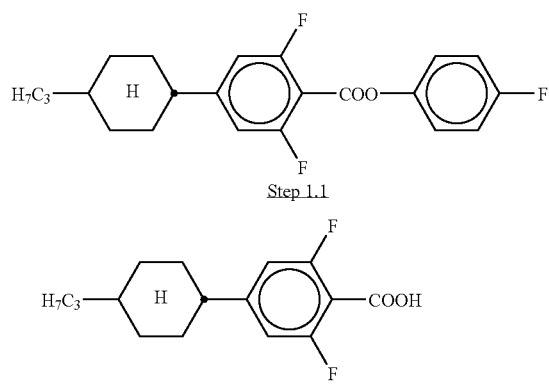

Step 1.1

1.32 mol of n-butyllithium (15% in n-hexane) are added dropwise over the course of 1 h to 1.2 mol of 4-(trans-4-propylcyclohexyl)-2,6-difluorobenzene in 3 l THF at −70° C. in a nitrogen atmosphere. Stirring is continued for 1 h, crushed dry ice is added at −70° C., and stirring is continued for a further 1.5 h. 3 l of water are added, the organic phase is separated off and the aqueous phase is extracted with toluene. The combined organic extracts are then subjected to conventional work-up.

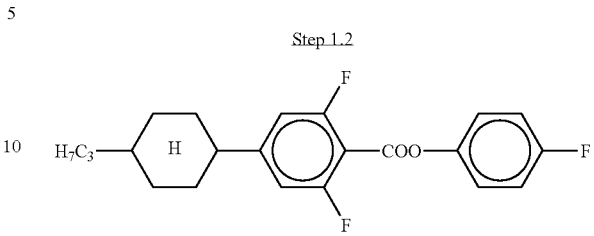

Step 1.2

A solution of 0.11 mol of DCC in 50 ml of toluene is added dropwise to 0.1 mol of 4-(trans-4-propylcyclohexyl)-2,6-difluorobenzoic acid, 0.1 mol of 4-fluorophenol and 0.004 mol of DMAP in 200 ml of toluene at 10° C. The mixture is stirred for 48 h at room temperature and then admixed with 0.016 mol of oxalic acid dihydrate. After stirring further for 1 h, solid constituents are separated off and the solution is subjected to conventional work-up. K 63 N 106.6 I; $\Delta n=+0.113$; $\Delta\epsilon=+13.72$.

The following compounds of the formula I

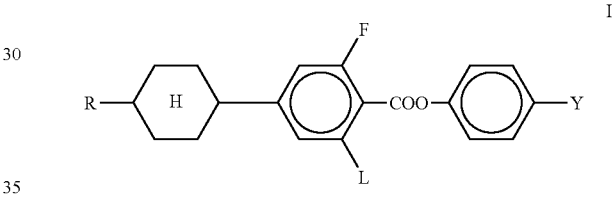

I are prepared in a similar manner:

| R | —(A$^1$—Z$^1$)$_m$— | L | Y | |
|---|---|---|---|---|
| CH$_3$ | cyclohexyl | H | F | |
| CH$_3$ | cyclohexyl | F | F | |
| C$_2$H$_5$ | cyclohexyl | H | F | |
| C$_2$H$_5$ | cyclohexyl | F | F | K 52 N 72.2 I; $\Delta\epsilon = 12.65$; $\Delta n = 0.109$ |
| n-C$_3$H$_7$ | cyclohexyl | H | F | |
| n-C$_4$H$_9$ | cyclohexyl | H | F | |

-continued
| R | —(A$^1$—Z$^1$)$_m$— | L | Y | |
|---|---|---|---|---|
| n-C$_4$H$_9$ |  | F | F | |
| n-C$_5$H$_{11}$ |  | H | F | |
| n-C$_5$H$_{11}$ |  | F | F | K 57 N 111.3 I; Δε = 11.8; Δn = 0.084 |
| n-C$_6$H$_{13}$ |  | H | F | |
| n-C$_6$H$_{13}$ | 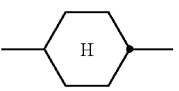 | F | F | |
| CH$_2$=CH |  | H | F | |
| CH$_2$CH |  | F | F | |
| CH$_2$CH |  | H | F | |
| CH$_3$CH=CH | 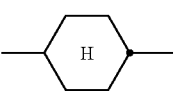 | F | F | |
| CH$_2$=CHCH$_2$ | 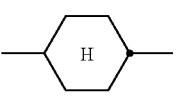 | H | F | |
| CH$_2$=CHCH$_2$ |  | F | F | |
| CH$_2$=CHC$_2$H$_4$ | 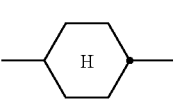 | H | F | |
| CH$_2$=CHC$_2$H$_4$ | 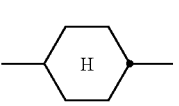 | F | F | |
| CH$_3$CH=CHCH$_2$ | 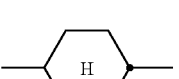 | H | F | |
| CH$_3$CH=CHCH$_2$ | 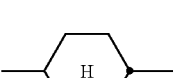 | F | F | |

-continued
| R | —(A¹—Z¹)ₘ— | L | Y | |
|---|---|---|---|---|
| CH₃CH=CHC₂H₄ |  | H | F | |
| CH₃CH=CHC₂H₄ | 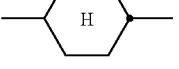 | F | F | |
| C₂H₅O |  | H | F | |
| C₂H₅O | 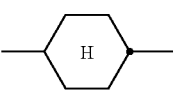 | F | F | |
| CH₃ | 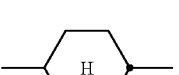 | H | OCF₃ | |
| CH₃ | 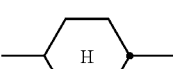 | F | OCF₃ | |
| C₂H₅ | 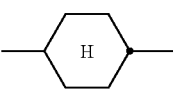 | H | OCF₃ | K 55 S_A 77 N 127.9 I; Δε = 16.38; Δn = 0.127 |
| C₂H₅ |  | F | OCF₃ | |
| n-C₃H₇ |  | H | OCF₃ | K 64 S_A 100 N 151.4 I; Δε = 15.97; Δn = 0.136 |
| n-C₃H₇ | 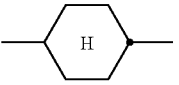 | F | OCF₃ | |
| n-C₄H₉ |  | H | OCF₃ | |
| n-C₄H₉ | 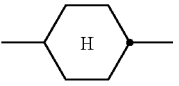 | F | OCF₃ | |
| n-C₅H₁₁ | 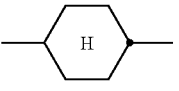 | H | OCF₃ | |
| n-C₅H₁₁ | 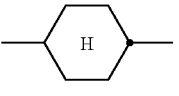 | F | OCF₃ | |
| n-C₆H₁₃ | 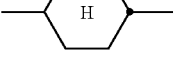 | H | OCF₃ | |

-continued
| R | —(A¹—Z¹)ₘ— | L | Y |
|---|---|---|---|
| n-C₆H₁₃ |  | F | OCF₃ |
| CH₂=CH | 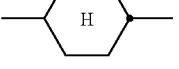 | H | OCF₃ |
| CH₂CH |  | F | OCF₃ |
| CH₂CH | 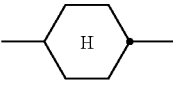 | H | OCF₃ |
| CH₃CH=CH | 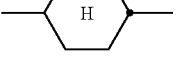 | F | OCF₃ |
| CH₂=CHCH₂ | 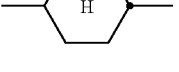 | H | OCF₃ |
| CH₂=CHCH₂ | 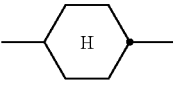 | F | OCF₃ |
| CH₂=CHC₂H₄ | 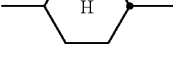 | H | OCF₃ |
| CH₂=CHC₂H₄ | 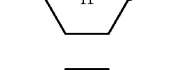 | F | OCF₃ |
| CH₃CH=CHCH₂ | 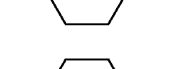 | H | OCF₃ |
| CH₃CH=CHCH₂ | 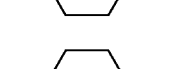 | F | OCF₃ |
| CH₃CH=CHC₂H₄ | 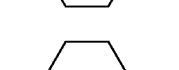 | H | OCF₃ |
| CH₃CH=CHC₂H₄ | 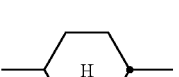 | F | OCF₃ |
| C₂H₅O | 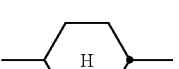 | H | OCF₃ |
| C₂H₅O |  | F | OCF₃ |

-continued
| R | —(A¹—Z¹)ₘ— | L | Y |
|---|---|---|---|
| CH₃ |  | H | OCHF₃ |
| CH₃ | 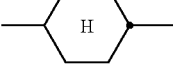 | F | OCHF₂ |
| C₂H₅ |  | H | OCHF₂ |
| C₂H₅ | 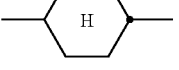 | F | OCHF₂ |
| n-C₃H₇ | 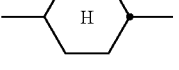 | H | OCHF₂ |
| n-C₄H₉ | 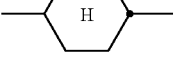 | H | OCHF₂ |
| n-C₄H₉ | 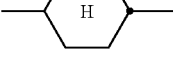 | F | OCHF₂ |
| n-C₅H₁₁ | 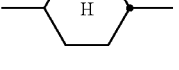 | H | OCHF₂ |
| n-C₅H₁₁ | 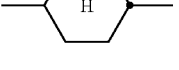 | F | OCHF₂ |
| n-C₆H₁₃ | 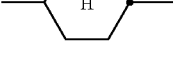 | H | OCHF₂ |
| n-C₆H₁₃ | 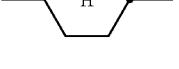 | F | OCHF₂ |
| CH₂=CH | 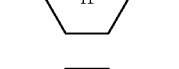 | H | OCHF₂ |
| CH₂CH | 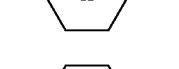 | F | OCHF₂ |
| CH₂CH | 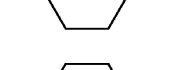 | H | OCHF₂ |
| CH₃CH=CH | 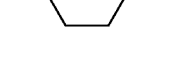 | F | OCHF₂ |

-continued
| R | —(A¹—Z¹)ₘ— | L | Y |
|---|---|---|---|
| CH₂=CHCH₂ |  | H | OCHF₂ |
| CH₂=CHCH₂ | 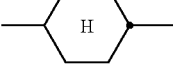 | F | OCHF₂ |
| CH₂=CHC₂H₄ |  | H | OCHF₂ |
| CH₂=CHC₂H₄ | 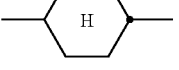 | F | OCHF₂ |
| CH₃CH=CHCH₂ | 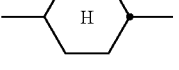 | H | OCHF₂ |
| CH₃CH=CHCH₂ | 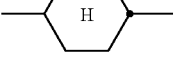 | F | OCHF₂ |
| CH₃CH=CHC₂H₄ | 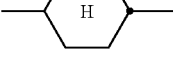 | H | OCHF₂ |
| CH₃CH=CHC₂H₄ | 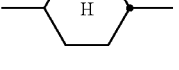 | F | OCHF₂ |
| C₂H₅O | 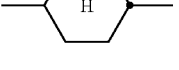 | H | OCHF₂ |
| C₂H₅O | 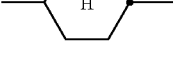 | F | OCHF₂ |
| n-C₃H₇ | 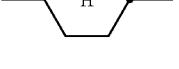 | F | OCHFCF₃ |
| n-C₃H₇ | 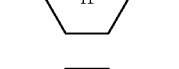 | F | OCF₂CHFCF₃ |
| CH₃CH₂OCH₂ | 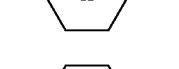 | H | CF₃ |
| n-C₅H₁₁ | 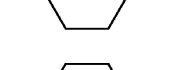 | F | CN |
| n-C₅H₁₁ | 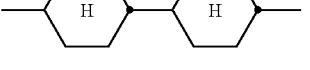 | H | OCF₃ |

-continued

| R | —(A¹—Z¹)$_m$— | L | Y |
|---|---|---|---|
| n-C$_5$H$_{11}$ | 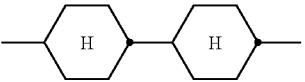 | F | F |

MIXTURE EXAMPLES

EXAMPLE M1

| | | | |
|---|---|---|---|
| CCH-34 | 5.00% | S→N [° C.]: | < −40.0 |
| CC-3-V1 | 4.00% | Clearing point [° C.]: | +70.5 |
| CCP-2F.F.F | 11.00% | Δn [589 nm, 20° C.]: | +0.0901 |
| CCP-3F.F.F | 10.00% | γ$_1$ [20° C.; mPa · s]: | 151 |
| CCP-3OCF$_3$ | 1.00% | | |
| CGU-2-F | 11.00% | | |
| CGU-3-F | 11.00% | | |
| CGU-5-F | 6.00% | | |
| CCZU-2-F | 5.00% | | |
| CCZU-3-F | 15.00% | | |
| CCZU-5-F | 5.00% | | |
| CGZP-2-OT | 10.00% | | |
| CGZP-3-OT | 6.00% | | |

EXAMPLE M2

| | | | |
|---|---|---|---|
| CC-3-V1 | 3.00% | S→N [° C.]: | < −40.0 |
| CCH-34 | 6.00% | Clearing point [° C.]: | +70.0 |
| CCP-2F.F.F | 11.00% | Δn [589 nm, 20° C.]: | +0.0904 |
| CCP-3F.F.F | 12.00% | γ$_1$ [20° C.; mPa · s]: | 149 |
| CGU-2-F | 11.00% | | |
| CGU-3-F | 11.00% | | |
| CGU-5-F | 5.00% | | |
| CCZU-2-F | 5.00% | | |
| CCZU-3-F | 15.00% | | |
| CCZU-5-F | 3.00% | | |
| CGZP-2-OT | 10.00% | | |
| CGZP-3-OT | 8.00% | | |

EXAMPLE M3

| | | | |
|---|---|---|---|
| CC-3-V1 | 5.00% | S→N [° C.]: | < −40.0 |
| CCH-34 | 6.00% | Clearing point [° C.]: | +70.5 |
| CCP-2F.F.F | 10.00% | Δn [589 nm, 20° C.]: | +0.0910 |
| CCP-3F.F.F | 10.00% | Δε [1 kHz; 20° C.]: | 4.8 |
| CGU-2-F | 11.00% | γ$_1$ [20° C.; mPa · s]: | 145 |
| CGU-3-F | 11.00% | | |
| CGU-5-F | 6.00% | | |
| CCZU-2-F | 5.00% | | |
| CCZU-3-F | 15.00% | | |
| CCZU-5-F | 3.00% | | |
| CGZP-2-OT | 10.00% | | |
| CGZP-3-OT | 8.00% | | |

EXAMPLE M4

| | | | |
|---|---|---|---|
| CC-3-V1 | 5.00% | S→N [° C.]: | < −40.0 |
| CCH-34 | 6.00% | Clearing point [° C.]: | +71.0 |
| CCP-2F.F.F | 10.00% | Δn [589 nm, 20° C.]: | +0.0905 |
| CCP-3F.F.F | 9.50% | Δε [1 kHz; 20° C.]: | 4.8 |
| CCP-2OCF$_3$ | 1.00% | γ$_1$ [20° C.; mPa · s]: | 144 |
| CGU-2-F | 11.00% | | |
| CGU-3-F | 11.00% | | |
| CGU-5-F | 5.50% | | |
| CCZU-2-F | 5.00% | | |
| CCZU-3-F | 15.00% | | |
| CCZU-5-F | 3.00% | | |
| CGZP-2-OT | 11.00% | | |
| CGZP-3-OT | 7.00% | | |

EXAMPLE M5

| | |
|---|---|
| CC-3-V1 | 5.00% |
| CCH-34 | 6.00% |
| CCP-2F.F.F | 11.00% |
| CCP-3F.F.F | 9.00% |
| CCP-2OCF$_3$ | 1.00% |
| CGU-2-F | 11.00% |
| CGU-3-F | 11.00% |
| CGU-5-F | 5.00% |
| CCZU-2-F | 5.00% |
| CCZU-3-F | 15.00% |
| CCZU-5-F | 3.00% |
| CGZP-2-OT | 11.00% |
| CGZP-3-OT | 7.00% |

EXAMPLE M6

| | |
|---|---|
| CC-3-V1 | 7.00% |
| CCH-34 | 6.00% |
| CCP-2F.F.F | 11.00% |
| CCP-3F.F.F | 7.00% |
| CGU-2-F | 11.00% |
| CGU-3-F | 11.00% |
| CGU-5-F | 5.00% |
| CCZU-2-F | 5.00% |
| CCZU-3-F | 15.00% |
| CCZU-5-F | 3.00% |
| CGZP-2-OT | 11.00% |
| CGZP-3-OT | 8.00% |

EXAMPLE M7

| | | |
|---|---|---|
| CC-3-V1 | 5.00% | Clearing point [° C.]: +71.0 |
| CCH-34 | 6.00% | Δn [589 nm, 20° C.]: +0.0904 |
| CCP-2F.F.F | 10.50% | |
| CCP-3F.F.F | 9.50% | |
| CGU-2-F | 11.00% | |
| CGU-3-F | 11.00% | |
| CGU-5-F | 5.00% | |
| CCZU-2-F | 5.00% | |
| CCZU-3-F | 15.00% | |
| CCZU-5-F | 4.00% | |
| CGZP-2-OT | 11.00% | |
| CGZP-3-OT | 7.00% | |

EXAMPLE M8

| | | |
|---|---|---|
| CC-3-V1 | 5.00% | Clearing point [° C.]: +71.0 |
| CCH-34 | 6.00% | Δn [589 nm, 20° C.]: +0.0908 |
| CCP-2F.F.F | 9.00% | |
| CCP-3F.F.F | 11.00% | |
| CGU-2-F | 11.00% | |
| CGU-3-F | 11.00% | |
| CGU-5-F | 6.00% | |
| CCZU-2-F | 5.00% | |
| CCZU-3-F | 15.00% | |
| CCZU-5-F | 3.00% | |
| CGZP-2-OT | 11.00% | |
| CGZP-3-OT | 7.00% | |

EXAMPLE M9

| | | |
|---|---|---|
| CC-3-V1 | 3.00% | S→N [° C.]: < −40.0 |
| CCP-2F.F.F | 10.00% | Clearing point [° C.]: +71.5 |
| CCP-3F.F.F | 10.00% | Δn [589 nm, 20° C.]: +0.0908 |
| CCP-20CF$_3$.F | 8.00% | γ$_1$ [20° C.; mPa · s]: 167 |
| CCP-40CF$_3$ | 5.00% | |
| CGU-2-F | 11.00% | |
| CGU-3-F | 11.00% | |
| CGU-5-F | 7.00% | |
| CCZU-2-F | 5.00% | |
| CCZU-3-F | 15.00% | |
| CCZU-5-F | 5.00% | |
| CGZP-2-OT | 5.00% | |
| CGZP-3-OT | 5.00% | |

EXAMPLE M10

| | | |
|---|---|---|
| BCH-32 | 3.00% | S→N [° C.]: < −40.0 |
| CC-3-V1 | 3.00% | Clearing point [° C.]: +70.0 |
| CCP-2F.F.F | 6.00% | Δn [589 nm, 20° C.]: +0.1046 |
| CCP-30CF$_3$ | 5.00% | γ$_1$ [20° C.; mPa · s]: 173 |
| CGU-2-F | 11.00% | |
| CGU-3-F | 10.00% | |
| CGU-5-F | 6.00% | |
| CCZU-2-F | 5.00% | |
| CCZU-3-F | 15.00% | |
| CCZU-5-F | 5.00% | |
| BCH-3F.F.F | 13.00% | |
| BCH-5F.F.F | 9.00% | |

-continued

| | |
|---|---|
| CGZP-2-OT | 2.00% |
| CGZP-3-OT | 7.00% |

EXAMPLE M11

| | | |
|---|---|---|
| CC-3-V1 | 3.00% | S→N [° C.]: < −40.0 |
| CCP-2F.F.F | 10.00% | Clearing point [° C.]: +70.5 |
| CCP-3F.F.F | 11.00% | Δn [589 nm, 20° C.]: +0.0902 |
| CCP-20CF$_3$.F | 8.00% | γ$_1$ [20° C.; mPa · s]: 166 |
| CCP-40CF$_3$ | 4.00% | |
| CGU-2-F | 11.00% | |
| CGU-3-F | 11.00% | |
| CGU-5-F | 7.00% | |
| CCZU-2-F | 5.00% | |
| CCZU-3-F | 15.00% | |
| CCZU-5-F | 5.00% | |
| CGZP-2-OT | 6.00% | |
| CGZP-3-OT | 4.00% | |

EXAMPLE M12

| | | |
|---|---|---|
| BCH-32 | 3.00% | S→N [° C.]: < −40.0 |
| CC-3-V1 | 3.00% | Clearing point [° C.]: +70.5 |
| CCP-2F.F.F | 5.00% | Δn [589 nm, 20° C.]: +0.1050 |
| CCP-30CF$_3$ | 5.00% | γ$_1$ [20° C.; mPa · s]: 174 |
| CGU-2-F | 10.00% | |
| CGU-3-F | 11.00% | |
| CGU-5-F | 6.00% | |
| CCZU-2-F | 5.00% | |
| CCZU-3-F | 15.00% | |
| CCZU-5-F | 5.00% | |
| BCH-3F.F.F | 13.00% | |
| BCH-5F.F.F | 10.00% | |
| CGZP-2-OT | 3.00% | |
| CGZP-3-OT | 6.00% | |

EXAMPLE M13

| | | |
|---|---|---|
| CCH-34 | 6.00% | S→N [° C.]: < −40.0 |
| CC-3-V1 | 2.00% | Clearing point [° C.]: +70.0 |
| CCP-2F.F.F | 11.00% | Δn [589 nm, 20° C.]: +0.0895 |
| CCP-3F.F.F | 12.00% | |
| CCP-20CF$_3$ | 1.00% | |
| CGU-2-F | 11.00% | |
| CGU-3-F | 5.00% | |
| CGU-5-F | 5.00% | |
| CCZU-2-F | 15.00% | |
| CCZU-3-F | 5.00% | |
| CCZU-5-F | 10.00% | |
| CGZP-2-OT | 6.00% | |
| CGZP-3-OT | | |

EXAMPLE M14

| | | | |
|---|---|---|---|
| CC-3-V1 | 4.00% | S→N [° C.]: | < −40.0 |
| CCH-34 | 3.00% | Clearing point [° C.]: | +70.5 |
| CCP-2F.F.F | 10.00% | Δn [589 nm, 20° C.]: | +0.0909 |
| CCP-3F.F.F | 7.00% | $\gamma_1$ [20° C.; mPa · s]: | 147 |
| CCP-3OCF$_3$ | 5.00% | Twist: | 90° |
| CGU-2-F | 11.00% | d · Δn [μm]: | 0.50 |
| CGU-3-F | 11.00% | $V_{(10, 0, 20)}$ [V]: | 1.00 |
| CGU-5-F | 2.00% | | |
| CCZU-2-F | 5.00% | | |
| CCZU-3-F | 15.00% | | |
| CCZU-5-F | 3.00% | | |
| CUZP-2-OT | 13.00% | | |
| CUZP-3-OT | 11.00% | | |

EXAMPLE M15

| | | | |
|---|---|---|---|
| CC-3-V1 | 4.00% | S→N [° C.]: | < −40.0 |
| CCH-34 | 4.00% | Clearing point [° C.]: | +71.0 |
| CCP-2F.F.F | 10.00% | Δn [589 nm, 20° C.]: | +0.0920 |
| CCP-3F.F.F | 4.00% | Twist: | 90° |
| BCH-2F.F.F | 3.00% | d · Δn [μm]: | 0.50 |
| CCP-2OCF$_3$ | 4.00% | $V_{(10, 0, 20)}$ [V]: | 1.00 |
| CGU-2-F | 10.00% | | |
| CGU-3-F | 10.00% | | |
| CGU-5-F | 2.00% | | |
| CCZU-2-F | 5.00% | | |
| CCZU-3-F | 15.00% | | |
| CCZU-5-F | 3.00% | | |
| CUZP-2-OT | 10.00% | | |
| CUZP-3-OT | 8.00% | | |
| CUZP-5-OT | 8.00% | | |

EXAMPLE M16

| | | | |
|---|---|---|---|
| CC-3-V1 | 2.00% | S→N [° C.]: | < −40.0 |
| CCH-34 | 5.00% | Clearing point [° C.]: | +70.5 |
| CCP-2F.F.F | 9.00% | Δn [589 nm, 20° C.]: | +0.0900 |
| CCP-3F.F.F | 9.00% | $\gamma_1$ [20° C.; mPa · s]: | 148 |
| CCP-3OCF$_3$ | 4.00% | Twist: | 90° |
| CGU-2-F | 11.00% | d · Δn [μm]: | 0.50 |
| CGU-3-F | 11.00% | $V_{(10, 0, 20)}$ [V]: | 0.98 |
| CGU-5-F | 2.00% | | |
| CCZU-2-F | 5.00% | | |
| CCZU-3-F | 15.00% | | |
| CCZU-5-F | 4.00% | | |
| CUZP-2-OT | 12.00% | | |
| CUZP-3-OT | 11.00% | | |

EXAMPLE M17

| | | | |
|---|---|---|---|
| CCH-34 | 5.00% | S→N [° C.]: | < −40.0 |
| CCP-2F.F.F | 11.00% | Clearing point [° C.]: | +72.0 |
| CCP-3F.F.F | 11.00% | Δn [589 nm, 20° C.]: | +0.0954 |
| CCP-2OCF$_3$.F | 10.00% | $\gamma_1$ [20° C.; mPa · s]: | 154 |
| CCP-3OCF$_3$ | 5.00% | Twist: | 90° |
| CCP-4OCF$_3$ | 5.00% | d · Δn [μm]: | 0.50 |
| CGU-2-F | 10.00% | $V_{(10, 0, 20)}$ [V]: | 1.09 |
| CGU-3-F | 10.00% | | |
| CGU-5-F | 4.00% | | |
| CPZG-2-OT | 2.00% | | |
| CPZG-3-OT | 4.00% | | |
| CUZP-2-OT | 12.00% | | |
| CUZP-3-OT | 10.00% | | |
| CBC-33 | 1.00% | | |

EXAMPLE M18

| | | | |
|---|---|---|---|
| CCP-2F.F.F | 10.00% | S→N [° C.]: | < −40.0 |
| CCP-3F.F.F | 11.00% | Clearing point [° C.]: | +70.5 |
| BCH-3F.F.F | 5.00% | Δn [589 nm, 20° C.]: | +0.0944 |
| CCP-3OCF$_3$ | 9.00% | $\gamma_1$ [20° C.; mPa · s]: | 169 |
| CGU-2-F | 10.00% | Twist: | 90° |
| CGU-3-F | 10.00% | d · Δn [μm]: | 0.50 |
| CGU-5-F | 3.00% | $V_{(10, 0, 20)}$ [V]: | 0.98 |
| CCZU-2-F | 4.00% | | |
| CCZU-3-F | 14.00% | | |
| CCZU-5-F | 2.00% | | |
| CUZP-2-OT | 12.00% | | |
| CUZP-3-OT | 10.00% | | |

EXAMPLE M19

| | | | |
|---|---|---|---|
| CCH-34 | 2.00% | S→N [° C.]: | < −40.0 |
| CCP-2F.F.F | 10.00% | Clearing point [° C.]: | +72.0 |
| CCP-3F.F.F | 12.00% | Δn [589 nm, 20° C.]: | +0.0908 |
| CCP-2OCF$_3$ | 5.00% | $\gamma_1$ [20° C.; mPa · s]: | 162 |
| CCP-3OCF$_3$ | 3.00% | Twist: | 90° |
| CGU-2-F | 10.00% | d · Δn [μm]: | 0.50 |
| CGU-2-F | 11.00% | $V_{(10, 0, 20)}$ [V]: | 0.95 |
| CCZU-2-F | 5.00% | | |
| CCZU-3-F | 15.00% | | |
| CCZU-5-F | 3.00% | | |
| CUZP-2-OT | 13.00% | | |
| CUZP-3-OT | 11.00% | | |

EXAMPLE M20

| | | | |
|---|---|---|---|
| CC-3-VI | 4.00% | S→N [° C.]: | < −40.0 |
| CCP-2F.F.F | 11.00% | Clearing point [° C.]: | +70.0 |
| CCP-3F.F.F | 11.00% | Δn [589 nm, 20° C.]: | +0.0900 |
| CCP-2OCF$_3$ | 6.00% | $\gamma_1$ [20° C.; mPa · s]: | 154 |
| CGU-2-F | 10.00% | Twist: | 90° |
| CGU-3-F | 11.00% | d · Δn [μm]: | 0.50 |
| CCZU-2-F | 5.00% | $V_{(10, 0, 20)}$ [V]: | 0.96 |
| CCZU-3-F | 15.00% | | |
| CCZU-5-F | 3.00% | | |
| CUZP-2-OT | 13.00% | | |
| CUZP-3-OT | 11.00% | | |

EXAMPLE M21

| | | | |
|---|---|---|---|
| CCH-34 | 3.00% | S→N [° C.]: | < −40.0 |
| CCP-2F.F.F | 11.00% | Clearing point [° C.]: | +70.5 |

-continued

| | | | |
|---|---|---|---|
| CCP-3F.F.F | 12.00% | $\Delta n$ [589 nm, 20° C.]: | +0.0900 |
| CCP-20CF$_3$ | 5.00% | $\gamma_1$ [20° C.; mPa · s]: | 154 |
| CCP-30CF$_3$ | 4.00% | Twist: | 90° |
| CGU-2-F | 11.00% | d · $\Delta n$ [µm]: | 0.50 |
| CGU-3-F | 10.00% | $V_{(10, 0, 20)}$ [V]: | 0.97 |
| CCZU-2-F | 5.00% | | |
| CCZU-3-F | 15.00% | | |
| CUZP-2-OT | 13.00% | | |
| CUZP-3-OT | 11.00% | | |

EXAMPLE M22

| | | | |
|---|---|---|---|
| CC-3-V1 | 5.00% | S→N [° C.]: | < −40.0 |
| CCP-2F.F.F | 10.00% | Clearing point [° C.]: | +70.0 |
| CCP-3F.F.F | 12.00% | $\Delta n$ [589 nm, 20° C.]: | +0.0892 |
| CCP-30CF$_3$ | 9.00% | $\gamma_1$ [20° C.; mPa · s]: | 154 |
| CGU-2-F | 11.00% | Twist: | 90° |
| CGU-3-F | 11.00% | d · $\Delta n$ [µm]: | 0.50 |
| CGU-5-F | 3.00% | $V_{(10, 0, 20)}$ [V]: | 0.99 |
| CCZU-2-F | 5.00% | | |
| CCZU-3-F | 15.00% | | |
| CCZU-5-F | 4.00% | | |
| CUZP-2-F | 11.00% | | |
| CUZP-3-F | 4.00% | | |

EXAMPLE M23

| | | | |
|---|---|---|---|
| CCH-34 | 5.00% | S→N [° C.]: | < −40.0 |
| CCP-2F.F.F | 11.00% | Clearing point [° C.]: | +69.0 |
| CCP-3F.F.F | 11.00% | $\Delta n$ [589 nm, 20° C.]: | +0.0958 |
| CCP-20CF$_3$.F | 6.00% | $\gamma_1$ [20° C.; mPa · s]: | 159 |
| CCP-30CF$_3$ | 6.00% | Twist: | 90° |
| CCP-40CF$_3$ | 5.00% | d · $\Delta n$ [µm]: | 0.50 |
| CGU-2-F | 11.00% | $V_{(10, 0, 20)}$ [V]: | 0.96 |
| CGU-3-F | 11.00% | | |
| CGU-5-F | 5.00% | | |
| CPZG-2-OT | 3.00% | | |
| CPZG-3-OT | 5.00% | | |
| CUZP-2-F | 10.00% | | |
| CUZP-3-F | 10.00% | | |
| CBC-33 | 1.00% | | |

EXAMPLE M24

| | | | |
|---|---|---|---|
| BCH-32 | 3.00% | S→N [° C.]: | < −40.0 |
| CCP-2F.F.F | 11.00% | Clearing point [° C.]: | +65.0 |
| CCP-3F.F.F | 9.00% | $\Delta n$ [589 nm, 20° C.]: | +0.0940 |
| BCH-3F.F.F | 6.00% | Twist: | 90° |
| CCP-30CF$_3$ | 7.00% | d · $\Delta n$ [µm]: | 0.50 |
| CGU-2-F | 11.00% | $V_{(10, 0, 20)}$ [V]: | 0.96 |
| CGU-3-F | 11.00% | | |
| CGU-5-F | 7.00% | | |
| CCZU-2-F | 5.00% | | |
| CCZU-3-F | 15.00% | | |
| CCZU-5-F | 5.00% | | |
| CUZP-2-F | 10.00% | | |

EXAMPLE M25

| | | | |
|---|---|---|---|
| BCH-32 | 5.00% | S→N [° C.]: | < −40.0 |
| CCP-2F.F.F | 11.00% | Clearing point [° C.]: | +70.0 |
| CCP-3F.F.F | 11.00% | $\Delta n$ [589 nm, 20° C.]: | +0.0946 |
| BCH-3F.F.F | 3.00% | Twist: | 90° |
| CCP-30CF$_3$ | 8.00% | d · $\Delta n$ [µm]: | 0.50 |
| CGU-2-F | 11.00% | $V_{(10, 0, 20)}$ [V]: | 1.00 |
| CGU-3-F | 11.00% | | |
| CGU-5-F | 5.00% | | |
| CCZU-2-F | 5.00% | | |
| CCZU-3-F | 15.00% | | |
| CCZU-5-F | 5.00% | | |
| CUZP-2-F | 10.00% | | |

EXAMPLE M26

| | | | |
|---|---|---|---|
| CCH-34 | 2.00% | S→N [° C.]: | < −40.0 |
| BCH-32 | 2.00% | Clearing point [° C.]: | +71.5 |
| CCP-2F.F.F | 10.00% | $\Delta n$ [589 nm, 20° C.]: | +0.0907 |
| CCP-3F.F.F | 12.00% | $\gamma_1$ [20° C.; mPa · s]: | 166 |
| CCP-30CF$_3$ | 9.00% | Twist: | 90° |
| CGU-2-F | 11.00% | d · $\Delta n$ [µm]: | 0.50 |
| CGU-3-F | 11.00% | $V_{(10, 0, 20)}$ [V]: | 0.99 |
| CGU-5-F | 3.00% | | |
| CCZU-2-F | 5.00% | | |
| CCZU-3-F | 15.00% | | |
| CCZU-5-F | 5.00% | | |
| CUZP-2-F | 11.00% | | |
| CUZP-3-F | 4.00% | | |

EXAMPLE M27

| | |
|---|---|
| CCH-34 | 3.00% |
| BCH-32 | 2.00% |
| CCP-2F.F.F | 11.00% |
| CCP-3F.F.F | 12.00% |
| CCP-30CF$_3$ | 9.00% |
| CGU-2-F | 11.00% |
| CGU-3-F | 11.00% |
| CGU-5-F | 3.00% |
| CCZU-2-F | 5.00% |
| CCZU-3-F | 15.00% |
| CCZU-5-F | 3.00% |
| CUZP-2-F | 11.00% |
| CUZP-3-F | 4.00% |

The invention claimed is:
1. A liquid-crystalline medium comprising:
at least one phenol ester of formula I

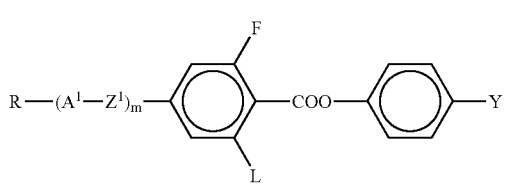

in which
R is H, an alkyl radical or alkenyl radical having up to 15 carbon atoms which is unsubstituted, monosubstituted by CN or $CF_3$ or at least monosubstituted by halogen, where, in addition, one or more $CH_2$ groups in said radicals are optionally replaced by —O—, —S—, —C≡C—, —OC—O— or —O—CO— in such a way that O atoms are not linked directly to one another, $A^1$ a) is a 1,4-cyclohexenylene or 1,4-cyclohexylene radical, in which in each case one or two non-adjacent $CH_2$ groups are each optionally replaced by —O— or —S—,
  b) is a 1,4-phenylene radical, in which one or two CH groups are each optionally replaced by N,
  c) is a piperidine-1,4-diyl, 1,4-bicyclo[2.2.2]octylene, naphthalene-2,6-diyl, decahydronaphthalene-2,6-diyl or 1,2,3,4-tetrahydronaphthalene-2,6-diyl radical,
  where the radicals a), b) and c) are in each case unsubstituted, monosubstituted or polysubstituted by halogen atoms, $Z^1$ is —CO—O—, —O—CO—, —CF_2O—, —OCF_2—, —CH_2O—, —OCH_2—, —CH_2CH_2—, —C_2F_4—, —C_2F_2—, —CH=CH—, —C≡C— or a single bond, Y is F, Cl, or a monohalogenated or polyhalogenated alkyl, alkenyl, alkenyloxy or alkoxy radical having up to 5 carbon atoms, L is H or F, and m is 0, 1 or 2; and one or more compounds of formulae RII to RVI

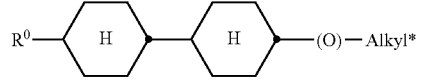
RI

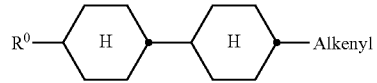
RII

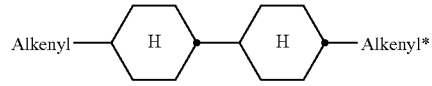
RIII

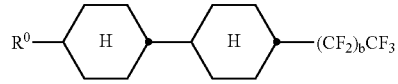
RIV

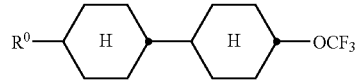
RV

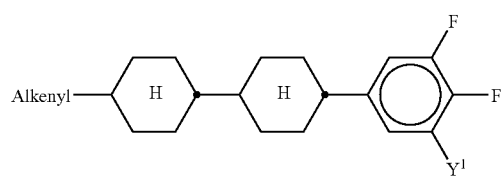
RVI wherein
$R^0$ is n-alkyl, oxoalkyl, fluoroalkyl, alkenyloxy or alkenyl, in each case having up to 9 carbon atoms,
b is 0, 1 or 2,
$Y^1$ is H or F,
Alkyl* is a straight-chain alkyl radical having up to 9 carbon atoms, and Alkenyl or Alkenyl* is, in each case independently of one another, an alkenyl radical having up to 9 carbon atoms.

2. A liquid-crystalline medium according to claim 1, wherein R is a straight-chain alkyl radical having 1 to 10 carbon atoms or an alkenyl radical having 2 to 10 carbon atoms.

3. A liquid-crystalline medium according to claim 1, wherein Y is F, Cl, $CF_3$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCF_2CF_2CF_3$, $OCF_2CHFCF_3$ or $OCClFCF_2CF_3$.

4. A liquid-crystalline medium according to claim 1, wherein m is 1.

5. A liquid-crystalline medium according to claim 1, wherein said compound of formula I is selected from subformulae I1 to I3 and I5 I12:

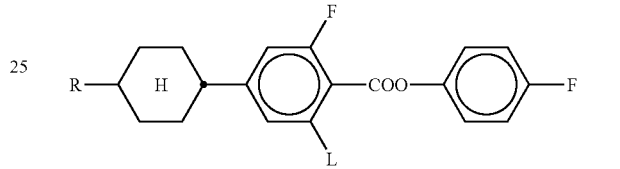
I1

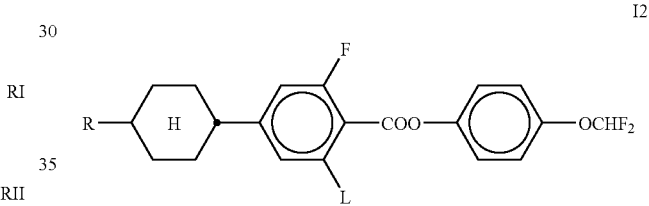
I2

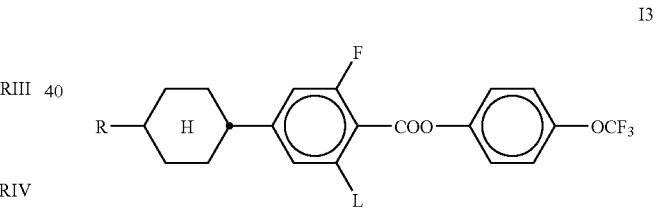
I3

I5

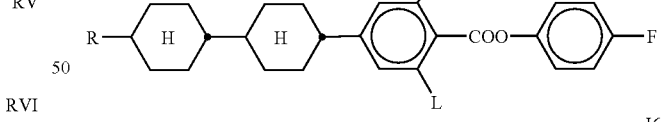
I6

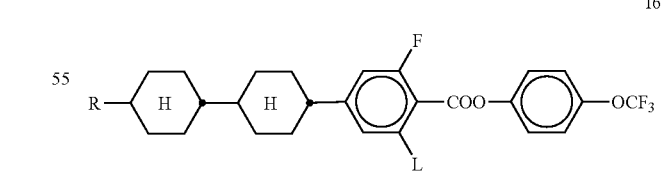
I7

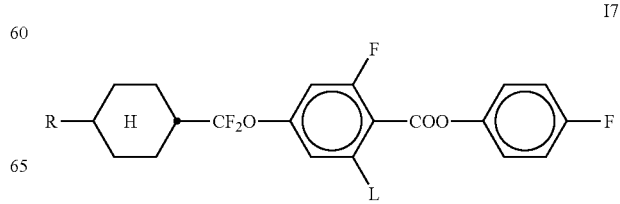

-continued

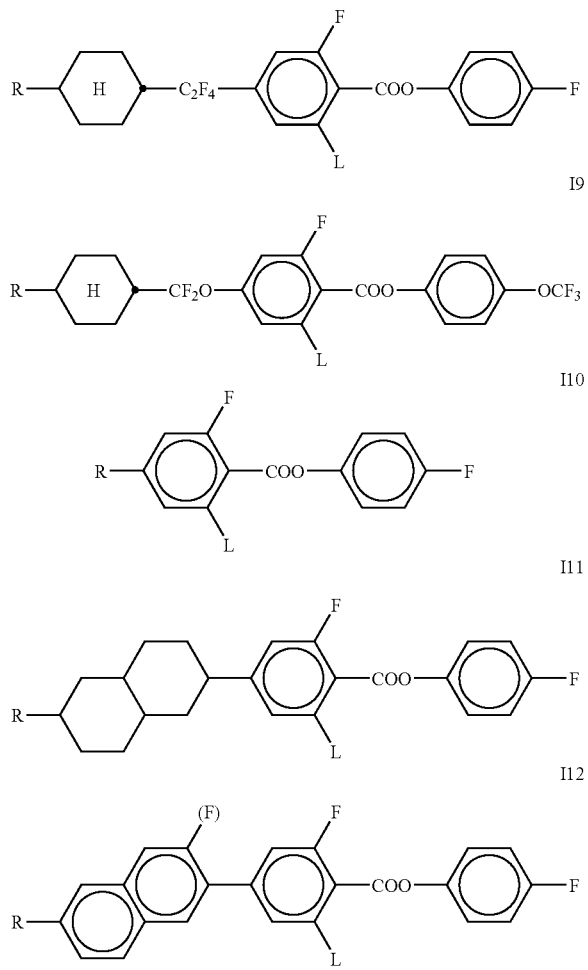

wherein
R is H, an alkyl radical or alkenyl radical having up to 15 carbon atoms which is unsubstituted, monosubstituted by CN or CF₃ or at least monosubstituted by halogen, where, in addition, one or more CH₂ groups in said radicals are optionally replaced by —O—, —S—, —C≡C—, —OC—O— or —O—CO— in such a way that O atoms are not linked directly to one another, and
L is H or F.

6. A medium according to claim 5, wherein said compound of said compound of formula I is subformula I3 in which L is H.

7. A medium according to claim 1, wherein said medium contains one or more compounds of formula RII.

8. A medium according to clam 7, wherein said medium contains one or more compounds of formula RIIa:

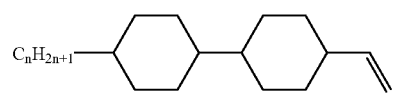

wherein n is an integer from 1 to 9.

9. A medium according to claim 7, wherein said medium contains one or more compounds of formula RIIb:

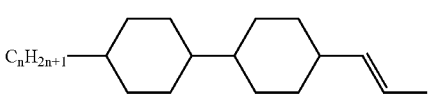

wherein n is an integer from 1 to 9.

10. A medium according to claim 9, wherein n is 3.

11. In a method of generating an electro-optical effect using a liquid-crystalline medium, the improvement wherein said liquid-crystalline medium is according to claim 1.

12. An electro-optical liquid-crystal display containing a liquid-crystalline medium, wherein said medium is according to claim 1.

13. A medium according to claim 1, wherein L is F.

14. A medium according to claim 1, wherein m is 1.

15. A medium according to claim 1, wherein $Z^1$ is a single bond, —CF₂O—, —OCF₂—, —C₂F₄—, —CH₂O—, —OCH₂— or —COO—.

16. A medium according to claim 1, wherein R is a straight-chain alkyl or straight-chain alkenyl radical which is monosubstituted by CN or CF₃.

17. A medium according to claim 1, wherein R is a straight-chain alkyl or straight-chain alkenyl radical which is at least monosubstituted by F or Cl.

18. A medium according to claim 1, wherein Y is F, OCF₃, OCHF₂, CF₃, OCHFCF₃, OC₂F₅ or OCF₂CHFCF₃.

19. A medium according to claim 1, wherein R is straight-chain alkyl, alkoxy, alkenyloxy or alkenyl having up to 10 carbon atoms.

20. A medium according to claim 1, wherein m is 1 or 2, and $A^1$ is Phe, PheF, PheFF, Cyc, Che, Pyr, Dio, Dec or Nap, and
Cyc is 1,4-cyclohexylene, Che is 1,4-cyclohexenylene, Dio is 1,3-dioxane-2,5-diyl, Phe is 1,4-phenylene radical, Pyr is pyrimidine-2,5-diyl, PheF is 2- or 3-fluoro-1,4-phenylene, PheFF is 2,3-difluoro- or 2,6-difluoro-1,4-phenylene, Nap is substituted or unsubstituted naphthalene, and Dec is decahydronaphthalene.

21. A medium according to claim 1, wherein said compound of formula I contains not more than one of the radicals Bi, Pyd, Pyr, Dio, Dit, Nap or Dec, and
Dio is 1,3-dioxane-2,5-diyl, Dit is 1,3-dithiane-2,5-diyl, Pyd is pyridine-2,5-diyl, Pyr is pyrimidine-2,5-diyl, Bi is bicyclo[2.2.2]octylene, Nap is substituted or unsubstituted naphthalene, and Dec is decahydronaphthalene.

22. A medium according to claim 6, wherein R is a straight-chain alkyl radical having 1 to 10 carbon atoms.

23. A medium according to claim 22, wherein said medium contains one or more compounds of formula RII.

24. A medium according to claim 23, wherein said medium contains one or more compounds of formula RIIb:

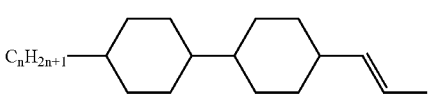

wherein n is an integer from 1 to 9.

25. A medium according to claim 24, wherein n is 3.

26. A liquid-crystalline phenol esters of formula I

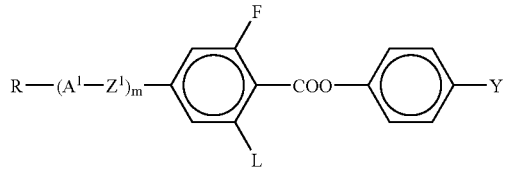

in which
R is H, an alkyl or alkenyl radical having up to 15 carbon atoms which is unsubstituted, monosubstituted by CN or $CF_3$ or at least monosubstituted by halogen, where, in addition, one or more $CH_2$ groups are optionally replaced by —O—, —S—, —CH=CH—, —C≡C—, —OC—O— or —O—CO— in such a way that O atoms are not linked directly to one another, $A^1$ a) is a 1,4-cyclohexenylene or 1,4-cyclohexylene radical, in which in each case one or two non-adjacent $CH_2$ groups are each optionally replaced by —O— or —S—, b) is a 1,4-phenylene radical, in which one or two CH are each optionally replaced by N, c) is a piperidine-1,4-diyl, 1,4-bicyclo[2.2.2]octylene, naphthalene-2,6-diyl, decahydronaphthalene-2,6-diyl or 1,2,3,4-tetrahydronaphthalene-2,6-diyl radical, where the radicals a), b) and c) are in each case unsubstituted or monosubstituted or polysubstituted by halogen atoms, $Z^1$ is —CO—O—, —O—CO—, —$CF_2$O—, —O$CF_2$—, —$CH_2$O—, —O$CH_2$—, —$CH_2CH_2$—, —$C_2F_4$—, —$C_2F_2$—, —CH=CH—, —C≡C— or a single bond, Y is $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCFHCFHCF_3$, $OCH_2CF_2CF_3$, $OCF_2CF_2CF_3$, $OCF_2CFHCFH_2$, $OCF_2CH_2CF_2H$, $OCFHCF_2CFH_2$, $OCFHCFHCF_2H$, $OCFHCH_2CF_3$, $OCH_2CFHCF_3$, $OCH_2CF_2CF_2H$, $OCF_2CFHCH_3$, $OCF_2CFHCFH_2$, $OCFHCF_2CH_3$, $OCFHCFHCFH_2$, $OCFHCH_2CF_3$, $OCH_2CF_2CFH_2$, $OCH_2CFHCF_2H$, $OCF_2CH_2CH_3$, $OCFHCFHCH_3$, $OCFHCH_2CFH_2$, $OCH_2CF_2CH_3$, $OCH_2CFHCFH_2$, $OCH_2CH_2CF_2H$, $OCHCH_2CH_3$, $OCH_2CFHCH_3$, $OCH_2CH_2CF_2H$, $OCClFCF_3$, $OCClFCClF_2$, $OCClFCFH_2$, $OCFHCCl_2F$, $OCClFCF_2H$, $OCClFCClF_2$, $OCF_2CClH_2$, $OCF_2CCl_2H$, $OCF_2CCl_2F$, $OCF_2CClFH$, $OCF_2CClF_2$, $OCF_2CF_2CClF_2$, $OCF_2CF_2CCl_2F$, $OCClFCF_2CF_3$, $OCClFCF_2CF_2H$, $OCClFCF_2CClF_2$, $OCClFCFHCF_3$, $OCClFCClFCF_3$, $OCCl_2CF_2CF_3$, $OCClHCF_2CF_3$, $OCClFCF_2CF_3$, $OCF_2CClFCFH_2$, $OCF_2CF_2CCl_2F$, $OCF_2CCl_2CF_2H$, $OCF_2CH_2CClF_2$, $OCClFCF_2CFH_2$, $OCFHCF_2CCl_2F$, $OCClFCFHCF_2H$, $OCClFCClFCF_2H$, $OCFHCFHCClF_2$, $OCClFCH_2CF_3$, $OCFHCCl_2CF_3$, $OCCl_2CFHCF_3$, $OCH_2CClFCF_3$, $OCCl_2CF_2CF_2H$, $OCH_2CF_2CClF_2$, $OCF_2CClFCH_3$, $OCF_2CFHCCl_2H$, $OCF_2CCl_2CFH_2$, $OCF_2CH_2CCl_2F$, $OCClFCF_2CH_3$, $OCFHCF_2CCl_2H$, $OCClFCClFCFH_2$, $OCFHCFHCCl_2F$, $OCClFCH_2CF_3$, $OCFHCCl_2CF_3$, $OCCl_2CF_2CFH_2$, $OCH_2CF_2CCl_2F$, $OCCl_2CFHCF_2H$, $OCClHCClFCF_2H$, $OCF_2CClHCClH_2$, $OCF_2CH_2CCl_2H$, $OCClFCFHCH_3$, $OCF_2CClFCCl_2H$, $OCClFCH_2CFH_2$, $OCFHCCl_2CFH_2$, $OCCl_2CF_2CH_3$, $OCH_2CF_2CClH_2$, $OCCl_2CFHCFH_2$, $OCH_2CClFCFCl_2$, $OCH_2CH_2CF_2H$, $OCClHCClHCF_2H$, $OCH_2CCl_2CF_2H$, $OCClFCH_2CH_3$, $OCFHCH_2CCl_2H$, $OCClHCFHCClH_2$, $OCH_2CFHCCl_2H$, $OCCl_2CH_2CF_2H$, $OCH_2CCl_2CF_2H$, CH=$CF_2$, CF=$CF_2$, OCH=$CF_2$, OCF=$CF_2$, CH=CHF, OCH=CHF, or CF=CHF, L is H or F, and m is 0, 1 or 2.

27. A liquid-crystalline medium comprising at least two mesogenic compounds, wherein said medium comprises at least one phenol ester according to claim 26.

28. A liquid-crystalline medium according to claim 27, wherein said medium additionally comprises one or more compounds selected from the group consisting of the formulae II, III, IV, V, VI, VII, VIII and IX:

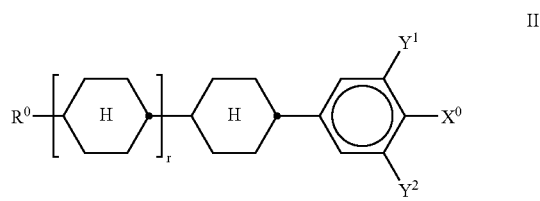

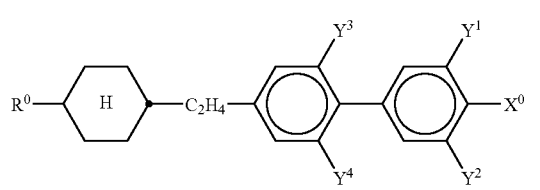

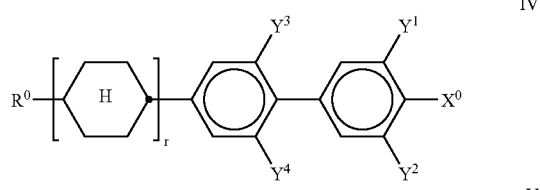

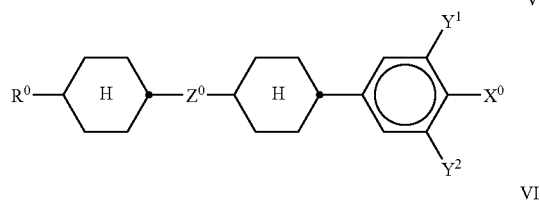

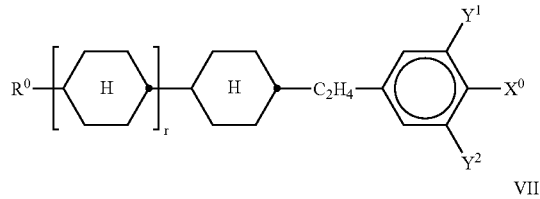

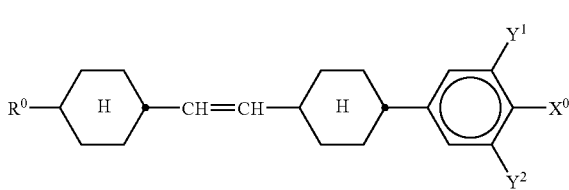

-continued

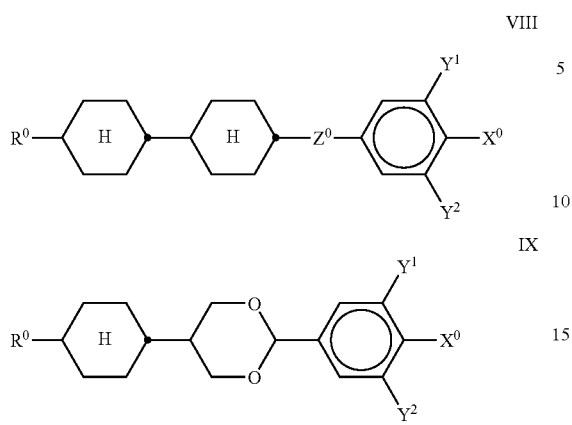

VIII

IX wherein

R⁰ is n-alkyl, oxaalkyl, fluoroalkyl, alkenyloxy or alkenyl, in each case having up to 9 carbon atoms, X⁰ is F, Cl, or halogenated alkyl, alkenyl or alkoxy, in each case having 1 to 6 carbon atoms, Z⁰ is —C$_2$H$_4$—, —C$_2$F$_4$—, —CF$_2$O—, —OCF$_2$— or —COO—,

Y¹, Y²,

Y³ and Y⁴ are each, independently of one another, H or F, and r is 0 or 1.

29. A medium according to claim 28, wherein X⁰ is F or OCF$_3$ and Y² is H or F.

30. A medium according to claim 27, wherein said medium further contains one or more compounds of formulae RII to RVI

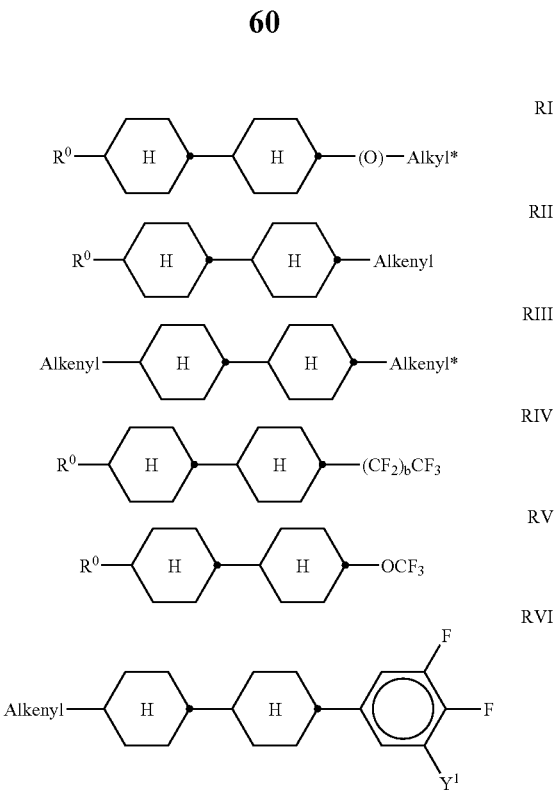

wherein

R⁰ is n-alkyl, oxoalkyl, fluoroalkyl, alkenyloxy or alkenyl, in each case having up to 9 carbon atoms, b is 0, 1 or 2, Y¹ is H or F, Alkyl* is a straight-chain alkyl radical having up to 9 carbon atoms, and Alkenyl or Alkenyl* is, in each case independently of one another, an alkenyl radical having up to 9 carbon atoms.

* * * * *

UNITED STATES PATENT AND TRADEMARK OFFICE
CERTIFICATE OF CORRECTION

PATENT NO.        : 7,316,830 B2                                    Page 1 of 1
APPLICATION NO. : 11/509018
DATED             : January 8, 2008
INVENTOR(S)       : Werner Binder It is certified that error appears in the above-identified patent and that said Letters Patent is hereby corrected as shown below:

On the Title page, Inventors: line 3, reads "Mühital" should read -- Mühltal --
On the Title page, Foreign Application Priority Data should be included:
-- Oct. 6, 1999 (DE) ... 19947954 --
Column 56, line 20, Claim 14, reads "according to claim 1," should read -- according to claim 2, --
Column 57, line 2, reads "phenol esters" should read -- phenol ester --
Column 58, line 17-18, reads "selected from the group consisting of the formulae" should read -- selected from formulae --
Column 60, line 32, reads "R°" should read -- $R^0$ --
Column 60, line 37, begin new line after "carbon atom, and"

Signed and Sealed this

Tenth Day of February, 2009

JOHN DOLL
*Acting Director of the United States Patent and Trademark Office*